(12) United States Patent
Ishii

(10) Patent No.: US 11,394,605 B2
(45) Date of Patent: Jul. 19, 2022

(54) COMMUNICATION SYSTEM, COMMUNICATION APPARATUS, AND PROGRAM

(71) Applicant: Mitsubishi Electric Corporation, Tokyo (JP)

(72) Inventor: Nobukazu Ishii, Nagoya (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/607,028

(22) PCT Filed: Jul. 11, 2019

(86) PCT No.: PCT/JP2019/027519
§ 371 (c)(1),
(2) Date: Oct. 28, 2021

(87) PCT Pub. No.: WO2021/005784
PCT Pub. Date: Jan. 14, 2021

(65) Prior Publication Data
US 2022/0150114 A1    May 12, 2022

(51) Int. Cl.
*G06F 15/177* (2006.01)
*H04L 41/0803* (2022.01)
*H04L 41/22* (2022.01)

(52) U.S. Cl.
CPC .......... *H04L 41/0803* (2013.01); *H04L 41/22* (2013.01)

(58) Field of Classification Search
CPC ........................ H04L 41/0803; H04L 41/22
(Continued)

(56) References Cited

U.S. PATENT DOCUMENTS 7,506,309 B2 * 3/2009 Schaefer ............... G07C 5/008
                                                    701/31.4
8,380,975 B2 * 2/2013 DiStefano .......... G05B 19/4186
                                                    713/1
(Continued)

FOREIGN PATENT DOCUMENTS

JP    2004-503150 A    1/2004
JP    2007-116549 A    5/2007
(Continued)

OTHER PUBLICATIONS

International Search Report and Written Opinion dated Oct. 8, 2019, received for PCT Application PCT/JP2019/027519, Filed on Jul. 11, 2019, 9 pages including English Translation.
(Continued)

*Primary Examiner* — Alicia Baturay
(74) *Attorney, Agent, or Firm* — Xsensus LLP

(57) ABSTRACT

An instruction terminal includes a storage that stores correspondence information that associates, for each of communication devices, identification information of the communication device and candidate parameters for communication with the communication device, a first instructor that issues an instruction to acquire the identification information of a network device that is a communication device of the communication devices and is connected to a communication apparatus via a network, a second instructor that issues an instruction to specify, from among candidate parameters that are included in the correspondence information and correspond to the identification information, a device parameter for the communication with the network device, and a receiver that receives specification information indicating the specified device parameter. A communication apparatus includes an acquirer that acquires the identification information from the network device, a
(Continued)

specifier that specifies the device parameter from among the candidate parameters, and a transmitter that transmits the specification information.

9 Claims, 22 Drawing Sheets

(58) Field of Classification Search
USPC .......................................................... 709/220
See application file for complete search history.

(56) References Cited

U.S. PATENT DOCUMENTS

| | | | | |
|---|---|---|---|---|
| 9,871,889 | B1* | 1/2018 | Daruwalla | H04L 67/42 |
| 10,102,332 | B1* | 10/2018 | Arechiga | G06F 30/17 |
| 10,122,631 | B1* | 11/2018 | Priddy | H04L 61/103 |
| 10,127,596 | B1* | 11/2018 | Franke | G06Q 30/0631 |
| 10,261,716 | B2* | 4/2019 | Sekimoto | G06F 3/0643 |
| 10,270,605 | B2* | 4/2019 | Otake | H04L 41/0668 |
| 10,310,798 | B2* | 6/2019 | Hanaki | G05B 23/02 |
| 10,333,784 | B2* | 6/2019 | Liu | H04L 41/5054 |
| 10,361,916 | B2* | 7/2019 | Liu | H04L 41/5054 |
| 10,616,175 | B2* | 4/2020 | Raj | H04L 61/2007 |
| 10,659,400 | B2* | 5/2020 | Moon | H04L 51/02 |
| 10,719,643 | B2* | 7/2020 | Horikawa | G05B 19/05 |
| 10,838,390 | B2* | 11/2020 | Nagao | G05B 19/056 |
| 10,861,601 | B2* | 12/2020 | Gutekunst | G06F 21/6245 |
| 11,029,972 | B2* | 6/2021 | Vichare | G06F 11/3466 |
| 11,070,441 | B2* | 7/2021 | Di Pietro | G06N 3/08 |
| 11,075,990 | B2* | 7/2021 | Himura | H04L 41/22 |
| 11,102,330 | B2* | 8/2021 | Gardner | G06F 11/0793 |
| 11,108,630 | B2* | 8/2021 | Woodland | G06F 8/65 |
| 11,188,048 | B2* | 11/2021 | Miyasaka | G05B 19/058 |
| 2004/0199647 | A1* | 10/2004 | Ramarao | H04L 63/1466 |
| | | | | 709/229 |
| 2006/0230165 | A1* | 10/2006 | Zimmer | G06F 9/4405 |
| | | | | 709/230 |
| 2010/0249952 | A1 | 9/2010 | Snide | |
| 2013/0198357 | A1 | 8/2013 | Wang | |
| 2016/0301595 | A1 | 10/2016 | Ashida | |
| 2016/0373268 | A1 | 12/2016 | Matsuoka | |
| 2018/0011467 | A1 | 1/2018 | Murayama | |
| 2021/0021464 | A1* | 1/2021 | Lubyanskyy | H04L 41/0843 |
| 2021/0028980 | A1* | 1/2021 | R | H04L 41/0869 |
| 2021/0075695 | A1* | 3/2021 | Lloyd | H04L 41/0886 |
| 2021/0281481 | A1* | 9/2021 | Richards | H04L 41/0843 |
| 2021/0314848 | A1* | 10/2021 | Tiwari | H04W 48/02 |

FOREIGN PATENT DOCUMENTS

| | | |
|---|---|---|
| JP | 2007-258979 A | 10/2007 |
| JP | 2010-181964 A | 8/2010 |
| JP | 2011-103626 A | 5/2011 |
| JP | 2012-522315 A | 9/2012 |
| JP | 2013-41597 A | 2/2013 |
| JP | 2013-178743 A | 9/2013 |
| JP | 2014-127840 A | 7/2014 |
| JP | 2016-197383 A | 11/2016 |
| JP | 2017-11487 A | 1/2017 |
| JP | 2019-67010 A | 4/2019 |
| WO | 02/05107 A1 | 1/2002 |
| WO | 2010/117648 A1 | 10/2010 |
| WO | 2015/079615 A1 | 6/2015 |

OTHER PUBLICATIONS

Decision to Grant dated Sep. 29, 2020, received for JP Application 2020-528363, 5 pages including English Translation.

* cited by examiner

FIG.6

| CORRESPONDENCE INFORMATION 121 | | | |
|---|---|---|---|
| IDENTIFICATION INFORMATION OF COMMUNICATION DEVICE | MANUFACTURER | CANDIDATE PARAMETER | |
| | | PORT NUMBER | PROTOCOL |
| 38:E0:8E:00:00:00 – 38:E0:8E:FF:FF:FF | MA | 5000, 5005, 1-4999, 5010-65534 | Pa1, Pa2, Pa3 | ← 80
| 00:26:92:00:00:00 – 00:26:92:FF:FF:FF | MB | 1-65534 | Pb1, Pb2, Pb3, Pb4 |
| ⋮ | ⋮ | ⋮ | ⋮ |

122

| DEVICE INFORMATION | | | | | | |
|---|---|---|---|---|---|---|
| NUMBER | ADDRESS | IDENTIFICATION INFORMATION | MANUFACT- URER | DEVICE TYPE | DEVICE PARAMETER | |
| | | | | | PORT NUMBER | PROTOCOL |
| 1 | – | – | – | – | – | – |

122

| DEVICE INFORMATION | | | | | | |
|---|---|---|---|---|---|---|
| NUMBER | ADDRESS | IDENTIFICATION INFORMATION | MANUFACT- URER | DEVICE TYPE | DEVICE PARAMETER | |
| | | | | | PORT NUMBER | PROTOCOL |
| 1 | 192.168.1.10 | 38:E0:8E: 99:99:10 | MA | TA1 | 3000 | Pa3 |
| 2 | 192.168.1.20 | 00:26:92: 33:45:20 | MB | TB4 | 6000 | Pb4 |

FIG.8

| DEVICE-TYPE SPECIFICATION INFORMATION ||
|---|---|
| MANUFACTURER | REQUEST DATA |
| MA | "REQUEST DEVICE TYPE" |
| MB | "REQ TYP" |

FIG.14

| LABEL INFORMATION | | | |
|---|---|---|---|
| MANUFACTURER | DEVICE TYPE | MEMORY ADDRESS | LABEL |
| MA | TA1 | X100 | ERROR CODE |
| | | X180 | ALERT |
| | | X200 | STATUS |
| | ⋮ | ⋮ | ⋮ |
| MB | TB4 | D100 | ERROR |
| | | D100 | LED |
| | ⋮ | ⋮ | ⋮ |
| ⋮ | ⋮ | ⋮ | ⋮ |

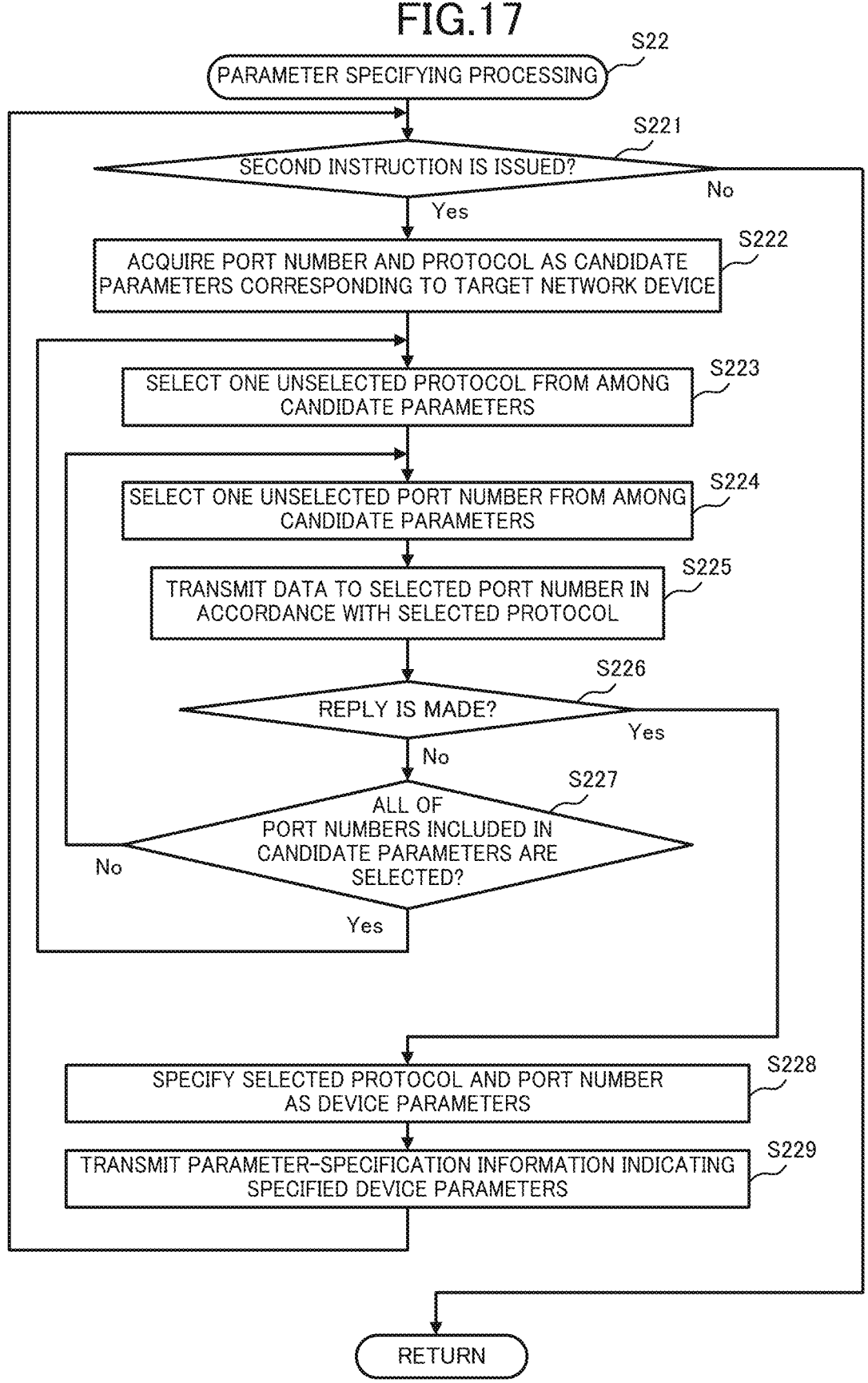

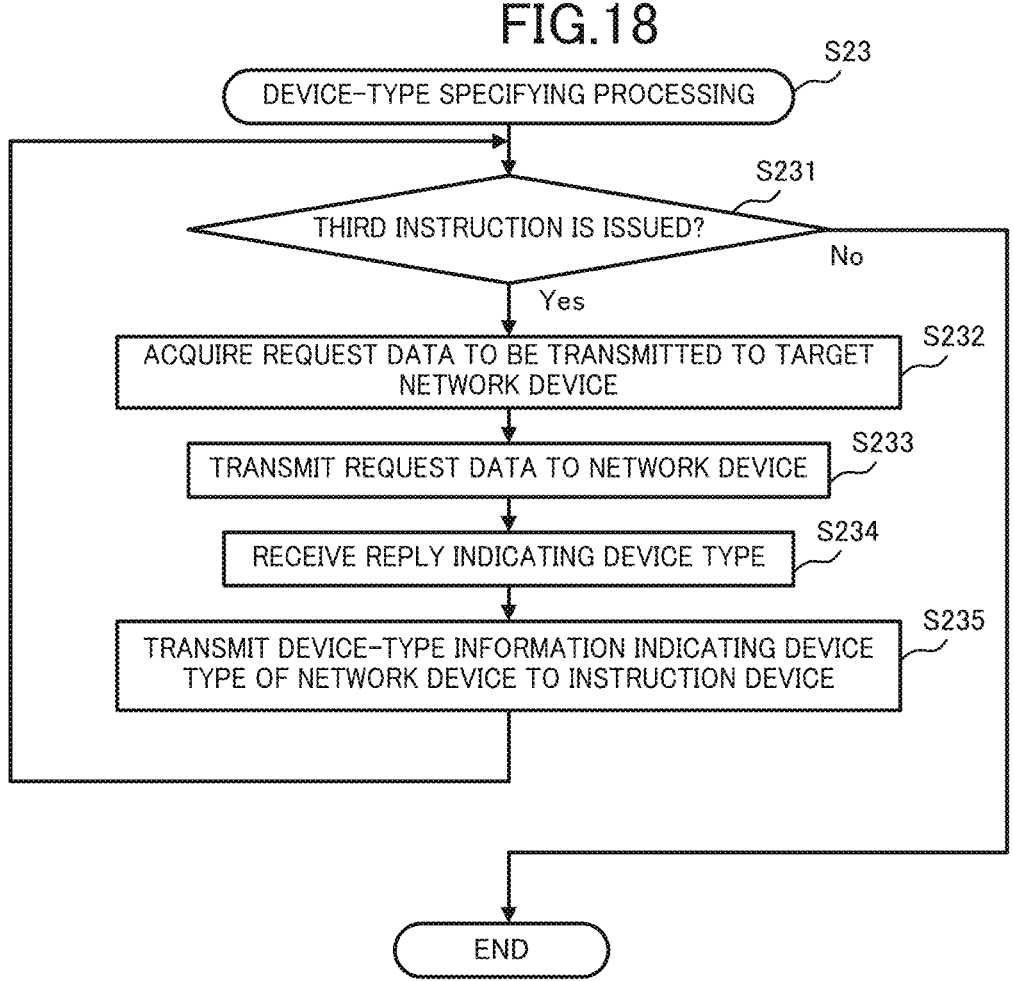

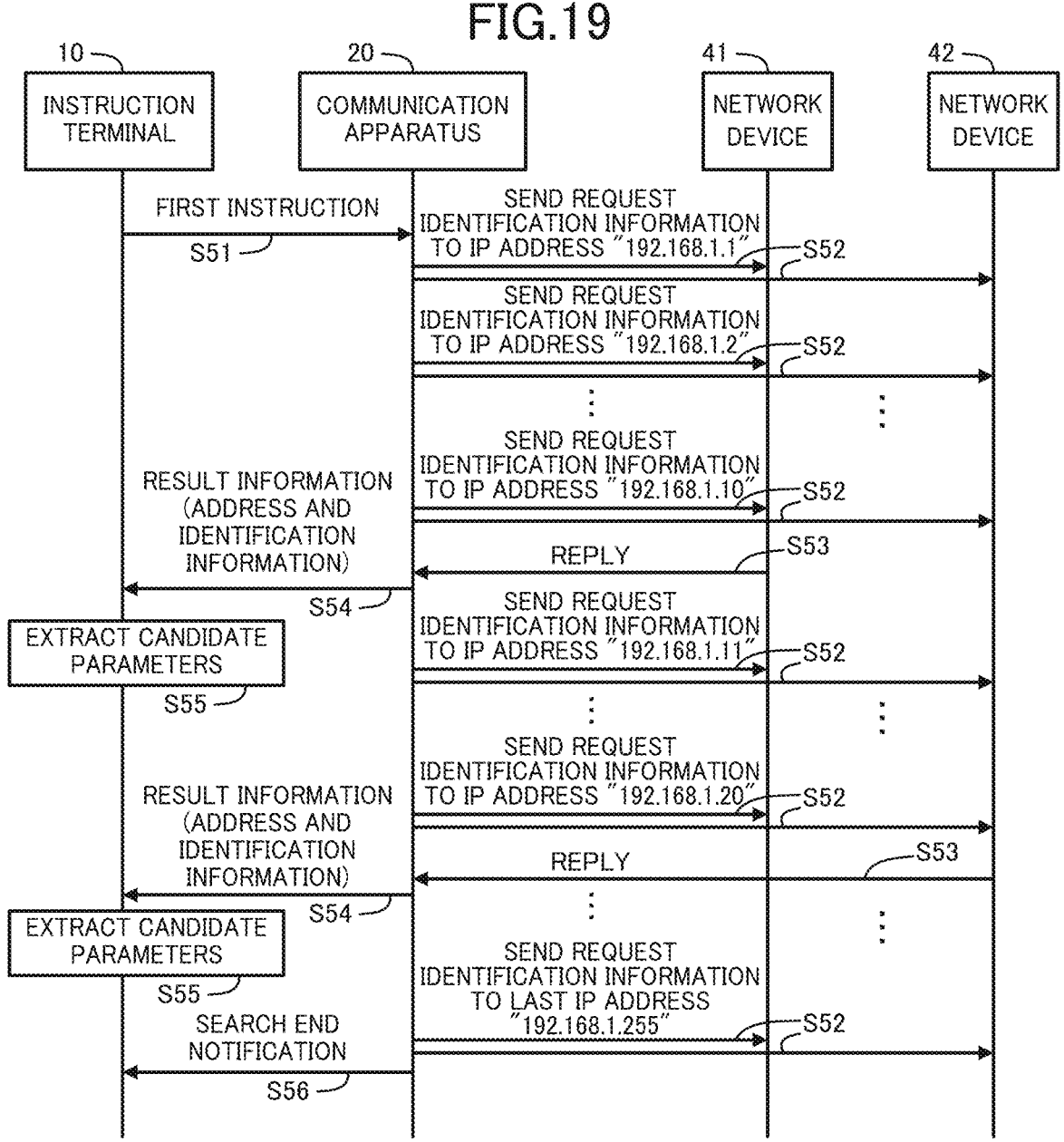

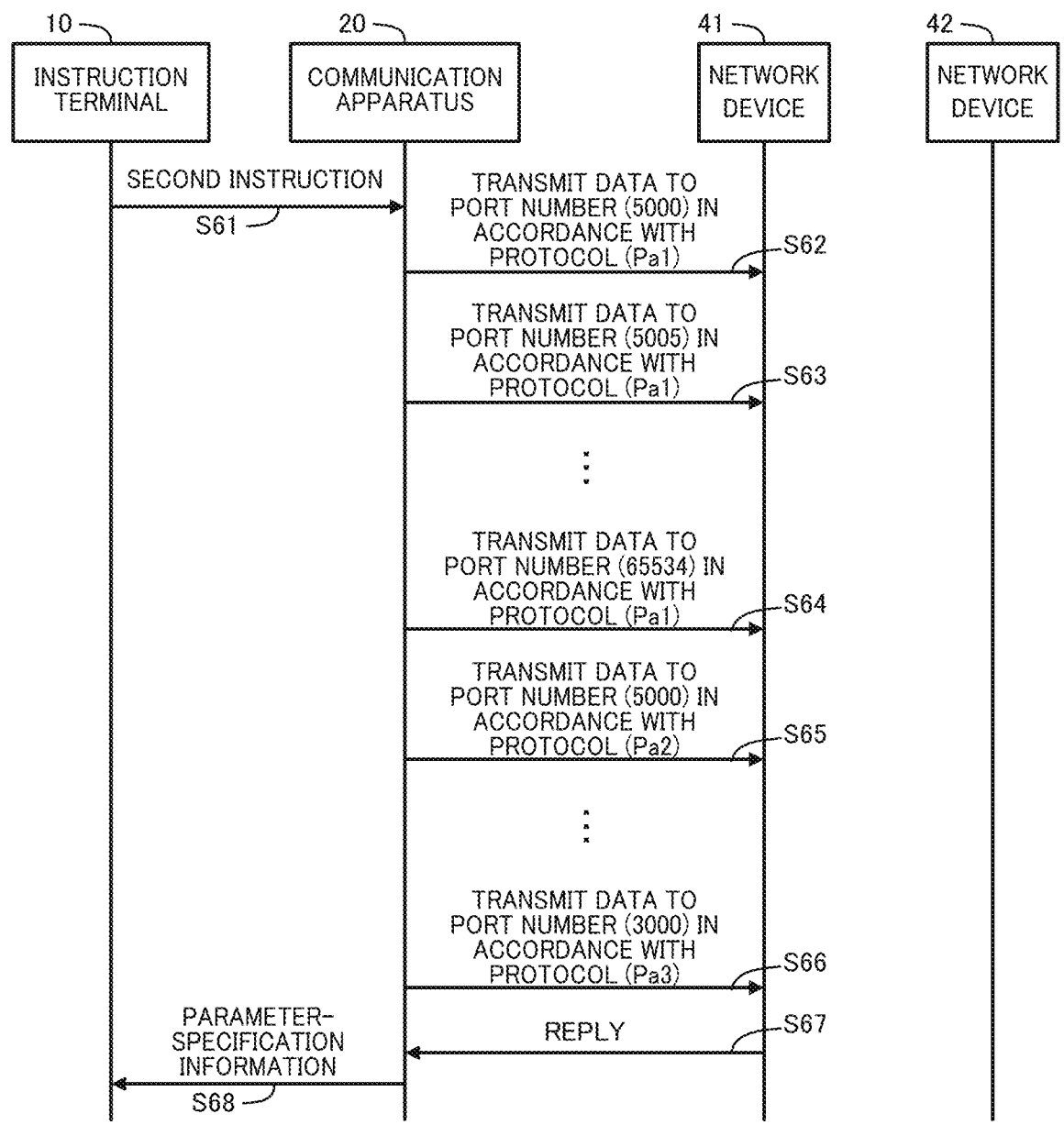

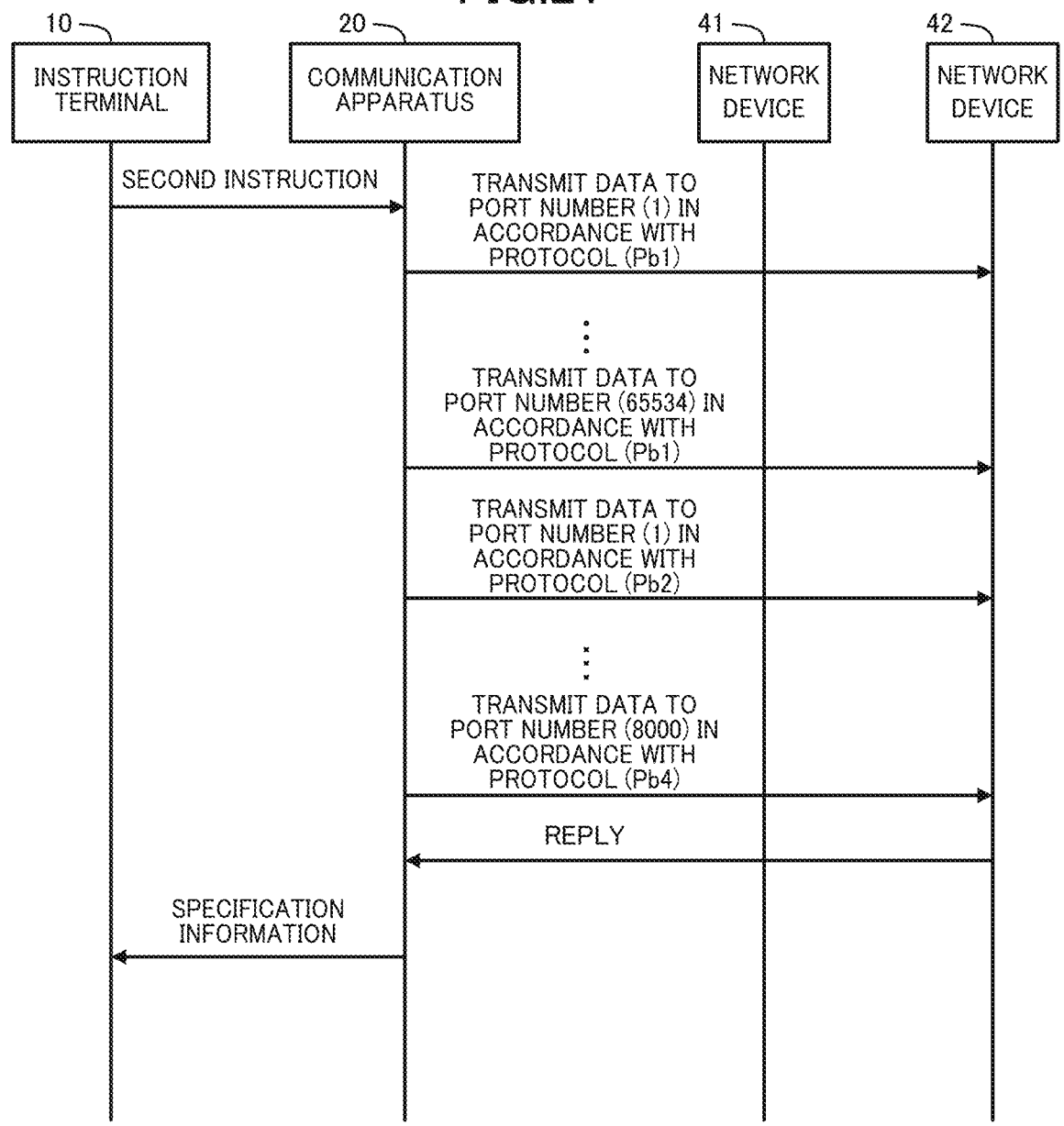

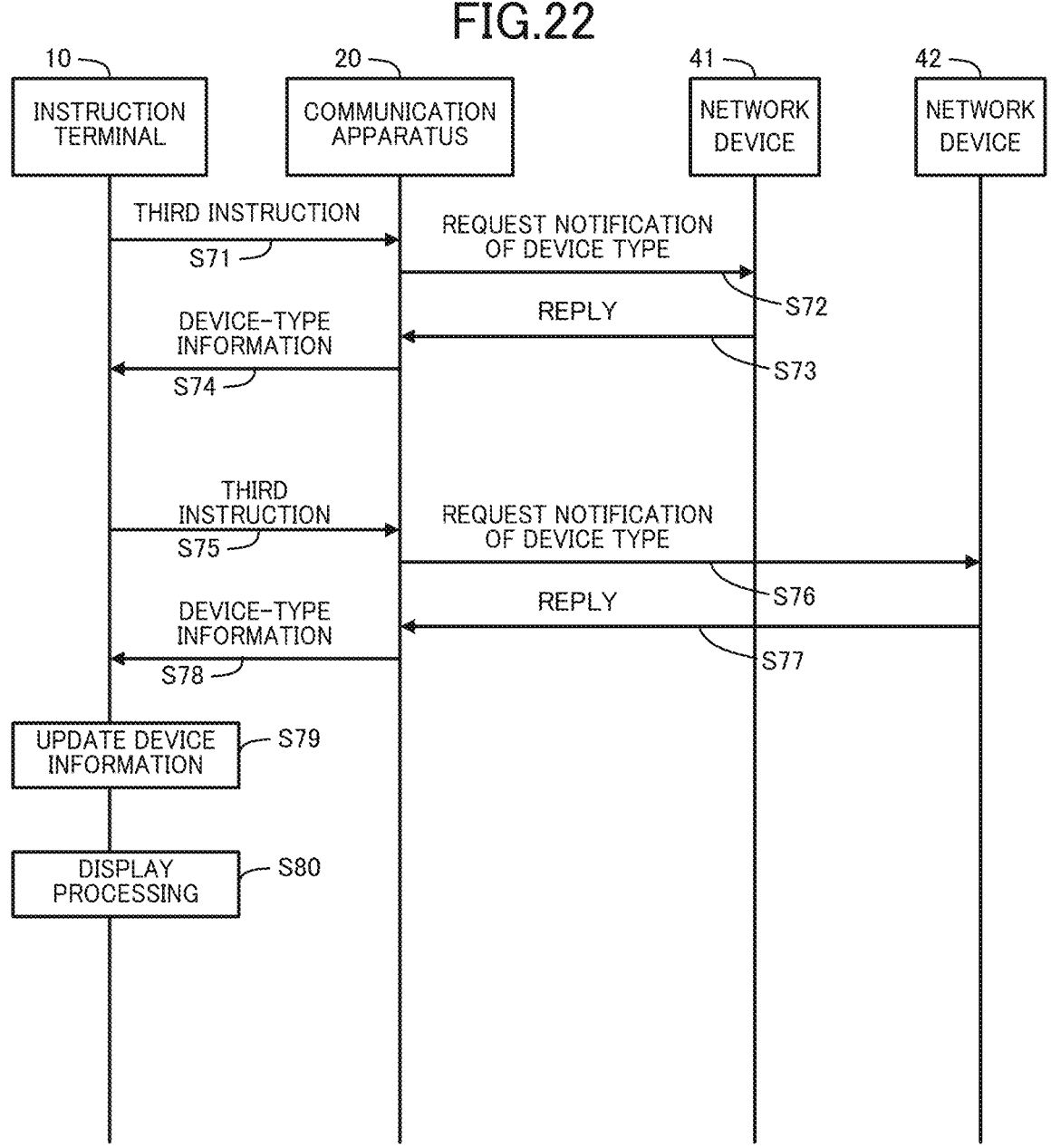

COMMUNICATION SYSTEM, COMMUNICATION APPARATUS, AND PROGRAM

CROSS-REFERENCE TO RELATED APPLICATION

The present application is based on PCT filing PCT/JP2019/027519, filed Jul. 11, 2019, the entire contents of which are incorporated herein by reference.

TECHNICAL FIELD

The present disclosure relates to a communication system, a communication apparatus, and a program.

BACKGROUND ART

In a facility, such as a factory, a processing system in which multiple devices are connected is constructed to achieve various types of processes such as a production process, inspection process, and the like. A programmable logic controller (PLC) serving as a communication apparatus performs reading and writing with respect to data stored in a memory of each of the devices via a network, thereby allowing the processing system to operate as a unit (for example, refer to Patent Literature 1).

CITATION LIST

Patent Literature

Patent Literature 1: Unexamined Japanese Patent Application Publication No. 2016-197383

SUMMARY OF INVENTION

Technical Problem

With regard to communication protocols to be followed in communication with the devices by the communication apparatus including the PLC used in the factory, due to differences in manufacturers of the devices, a situation often occurs in which the devices differ in a higher layer, such as an application layer, of layers of the Transmission Control Protocol/Internet Protocol (TCP/IP) model, while lower layers of the TCP/IP model, such as a network interface layer, an internet layer, and a transport layer, are unified. Examples of this type of communication protocol in the higher layer include Seamless Message Protocol (SLMP) and MODBUS/TCP. In a case in which the processing system of Patent Literature 1 includes devices that differ in the higher layer communication protocol, simple connection by cable cannot allow the PLC to communicate with each device for control. Thus, achievement of communication by the PLC with a device that is different from the PLC in a higher layer protocol such as an application layer requires connecting to the PLC a terminal for setting operation of the PLC and manually performing, by a user by using the terminal, setting for the device including setting for an IP address, a port number, and a communication protocol in the application layer.

However, advance preparing of information relating to all devices included in the processing system is a heavy burden on the user. Additionally, a large-scale system that includes numerous devices leads to numerous necessary setting items, imposing a heavy workload on the user. Furthermore, setting errors readily occur in such a system, imposing a heavy workload on the user.

The present disclosure is made in view of the aforementioned circumstances, and an objective of the present disclosure is to reduce the workload of the user.

Solution to Problem

To achieve the aforementioned objective, a communication system according to the present disclosure is a communication system that includes a communication apparatus to connect to a network and an instruction terminal to receive input from a user and to send instructions to the communication apparatus. The instruction terminal includes (i) storage means for storing correspondence information that associates, for each of communication devices, (a) identification information for identification of the communication device and (b) candidate parameters, the identification information being held by the communication device for unique identification thereof, the candidate parameters being candidates of a parameter for communication with the communication device, (ii) first instruction means for issuing to the communication apparatus an instruction to acquire the identification information of a network device that is a communication device of the communication devices and is connected to the communication apparatus via the network, (iii) second instruction means for issuing to the communication apparatus an instruction to specify, from among the candidate parameters that are included in the correspondence information and correspond to the identification information acquired in accordance with the instruction from the first instruction means, a device parameter for communication with the network device, and (iv) reception means for receiving, from the communication apparatus, specification information indicating the device parameter specified by the communication apparatus. The communication apparatus includes (i) acquisition means for acquiring the identification information from the network device in accordance with the instruction from the first instruction means, (ii) specifying means for specifying the device parameter from among the candidate parameters in accordance with the instruction from the second instruction means, and (iii) transmission means for transmitting the specification information to the instruction terminal.

Advantageous Effects of Invention

According to the present disclosure, the specifying means included in the communication apparatus specifies the device parameter for communication with the network device, and the reception means included in the instruction terminal receives from the communication apparatus the specification information indicating the specified device parameter. This configuration eliminates the need by the user to prepare in advance information relating to each network device, leading to reduction in the workload imposed on the user.

BRIEF DESCRIPTION OF DRAWINGS

FIG. 6 illustrates correspondence information according to the embodiment;

FIG. 8 illustrates device-type specification information according to the embodiment;

FIG. 14 illustrates label information according to the embodiment;

FIG. 17 is a flowchart of parameter specifying processing according to the embodiment;

FIG. 18 is a flowchart of device-type specifying processing according to the embodiment;

FIG. 19 is a first diagram for explanation of flow of data according to the embodiment;

FIG. 20 is a second diagram for explanation of flow of data according to the embodiment;

FIG. 21 is a third diagram for explanation of flow of data according to the embodiment; and FIG. 22 is a fourth diagram for explanation of flow of data according to the embodiment.

DESCRIPTION OF EMBODIMENTS

Figure 1:
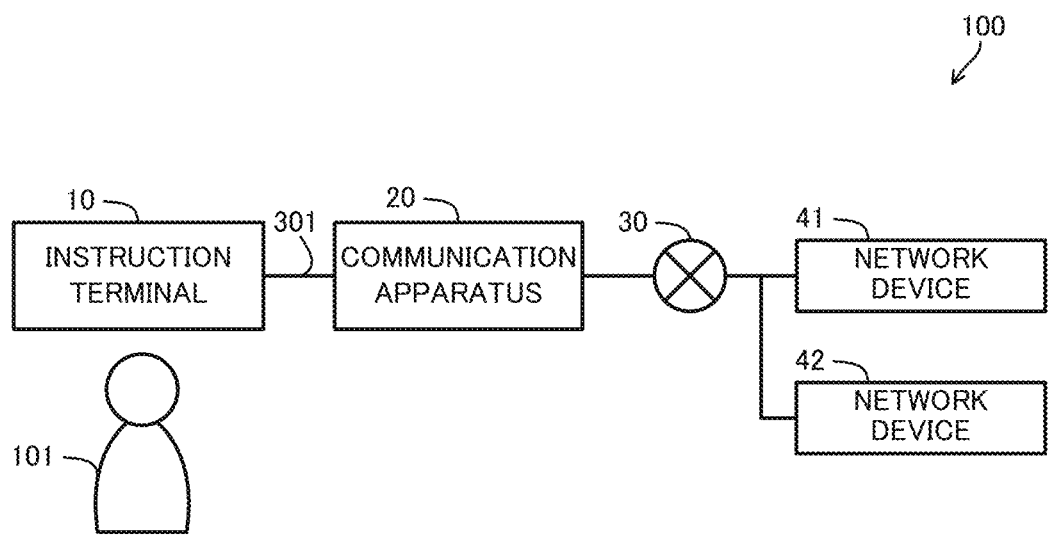
FIG. 1 illustrates configuration of a communication system according to an embodiment of the present disclosure.

Hereinafter, a communication system 100 according to an embodiment of the present disclosure is described in detail with reference to the drawings.

Embodiment

The communication system 100 according to the present embodiment is a factory automation (FA) system constructed in a factory, and performs, for example, a process such as a manufacturing process, an inspection process, a machining process, and the like. The communication system 100 includes a communication apparatus 20 connected to a network 30, an instruction terminal 10 that receives input from a user 101 and sends instructions to the communication apparatus 20, and network devices 41 and 42 connected to the network 30. With regard to communications performed by the communication apparatus 20, the instruction terminal 10, and the network devices 41 and 42, the communications are assumed to be unified with respect to communication protocols in lower layers of the TCP/IP model, such as a network interface layer, an internet layer, and a transport layer.

The instruction terminal 10 is, for example, an industrial personal computer (IPC) or a tablet terminal, and includes a graphical user interface (GUI) that allows the user 101 to input information. The instruction terminal 10, by executing a tool application, functions as a user interface (UI) for sending various types of instructions to the communication apparatus 20. This tool application is also called an engineering tool.

The instruction terminal 10 is connected to the communication apparatus 20 via a communication line 301. The communication line 301 may be, for example, a universal serial bus (USB) cable or a dedicated line, or other cable. Additionally, the network 30 may be substantially equivalent to the communication line 301. That is to say, a configuration may be employed in which the communication system 100 does not include the communication line 301 illustrated in FIG. 1 and the instruction terminal 10 is connected to the communication apparatus 20 via the network 30.

The communication apparatus 20 is a controller such as a PLC, and communicates with the network devices 41 and 42 to control the network devices 41 and 42. Each of the network devices 41 and 42 may be any of a sensor device, an actuator, or a robot, or another device. The communication apparatus 20, based on a sensing result that is a result of sensing by the network device 41 serving as a sensor device, controls operation of the network device 42 serving as an actuator. Content of control processing executed by the communication apparatus 20 is freely stipulated by the user. The number of devices that serve as control targets of the communication apparatus 20 is not limited two, and may be one or three or more.

The communication apparatus 20 is connected to the network devices 41 and 42 via the network 30. The network 30 is an industrial communication network, and may be an Ethernet network that employs Ethernet® as a communication protocol in the network interface layer of the TCP/IP model, or may be another type of network. Hereinafter, a case is mainly described in which the network 30 is the Ethernet network. The communication apparatus 20 and the network devices 41 and 42 are connected to one another via an Ethernet cable, each of the communication apparatus 20 and the network devices 41 and 42 holds in advance a media access control (MAC) address that is identification information for unique identification thereof, and also is assigned an IP address indicating a destination to which data is transmitted via the network 30. The IP address is set in advance for each of the network devices 41 and 42. Whereas the IP address is assigned for each of the apparatus and the devices when the communication system 100 is constructed, the identification information differs from the IP address in that the identification information is normally assigned to each of the apparatus and the devices during manufacture and is unique information held in advance by the apparatus or the device itself when disconnected from the network 30. Each of the network devices 41 and 42 may be a PLC, or may be an input-output unit that is connected via a network.

Figure 2:
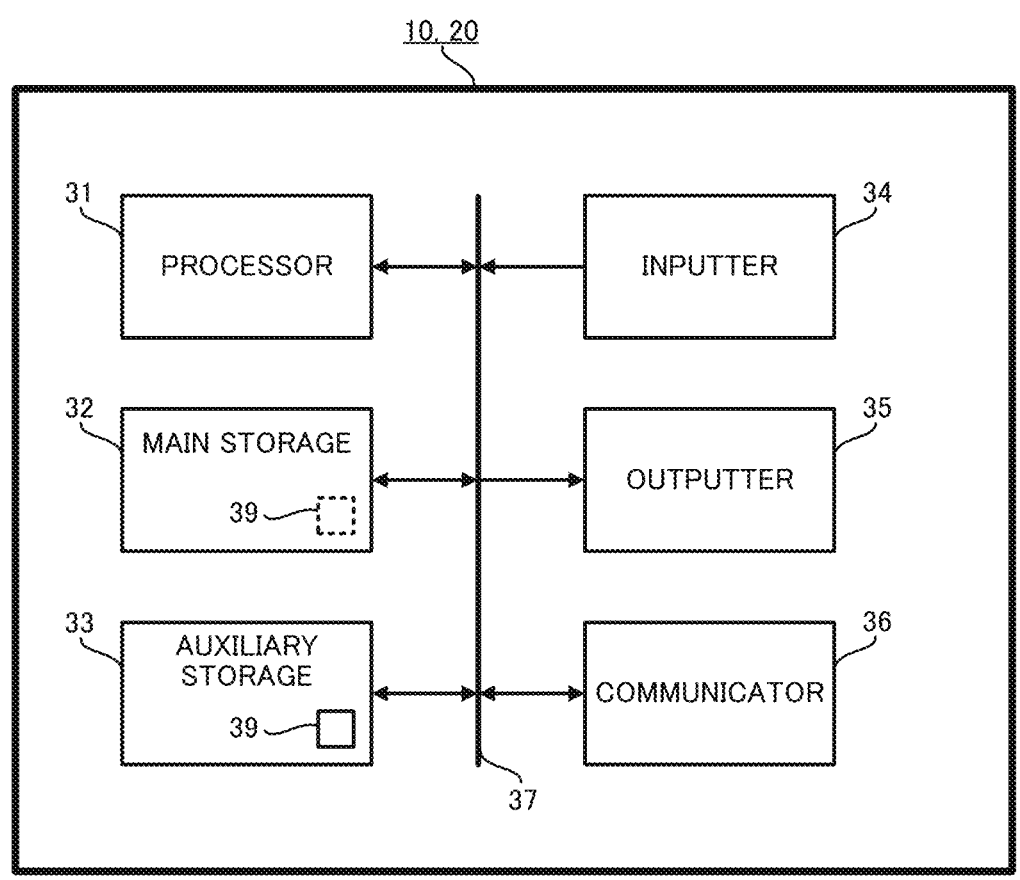
FIG. 2 illustrates hardware configuration of an instruction terminal and a communication apparatus according to the embodiment.

Each of the instruction terminal 10 and the communication apparatus 20 includes, as illustrated in FIG. 2, a processor 31, a main storage 32, an auxiliary storage 33, an inputter 34, an outputter 35, and a communicator 36. The main storage 32, the auxiliary storage 33, the inputter 34, the outputter 35, and the communicator 36, are connected to the processor 31 via an internal bus 37.

The processor 31 includes a central processing unit (CPU). The processor 31 executes a program 39 stored in the auxiliary storage 33 to achieve various types of functions of the instruction terminal 10 or the communication apparatus 20, thereby executing processing described later.

The main storage 32 includes random access memory (RAM). The program 39 is loaded from the auxiliary storage 33 into the main storage 32. The main storage 32 is used by the processor 31 as a work area.

The auxiliary storage 33 includes a nonvolatile memory such as an electrically erasable programmable read-only memory (EEPROM) and a hard disk drive (HDD). The auxiliary storage 33 stores the program 39 and various types of data used for processing by the processor 31. The auxiliary storage 33, in accordance with instructions from the processor 31, supplies to the processor 31 data to be used by the processor 31 and stores data supplied from the processor 31. Although FIG. 2 illustrates in a representative manner only one program, that is, the program 39, the auxiliary storage 33 may store multiple programs, and multiple programs may be loaded into the main storage 32.

The inputter 34 includes an input device such as input keys and a pointing device. The inputter 34 acquires information inputted by the user of the instruction terminal 10 and the communication apparatus 20, and sends notification of the acquired information to the processor 31.

The outputter 35 includes an output device such as a liquid crystal display (LCD) and a speaker. The outputter 35 presents various types of information to the user in accordance with instructions from the processor 31. The communication apparatus 20 may omit the inputter 34 and the outputter 35 of the communication apparatus 20, since the instruction terminal 10 functions as a UI of the communication apparatus 20.

The communicator 36 includes a network interface circuit for communicating with an external device. The communicator 36 receives a signal from the exterior and outputs data indicated by the signal to the processor 31. Further, the communicator 36 transmits to the external device a signal indicating data output from the processor 31.

Figure 3:
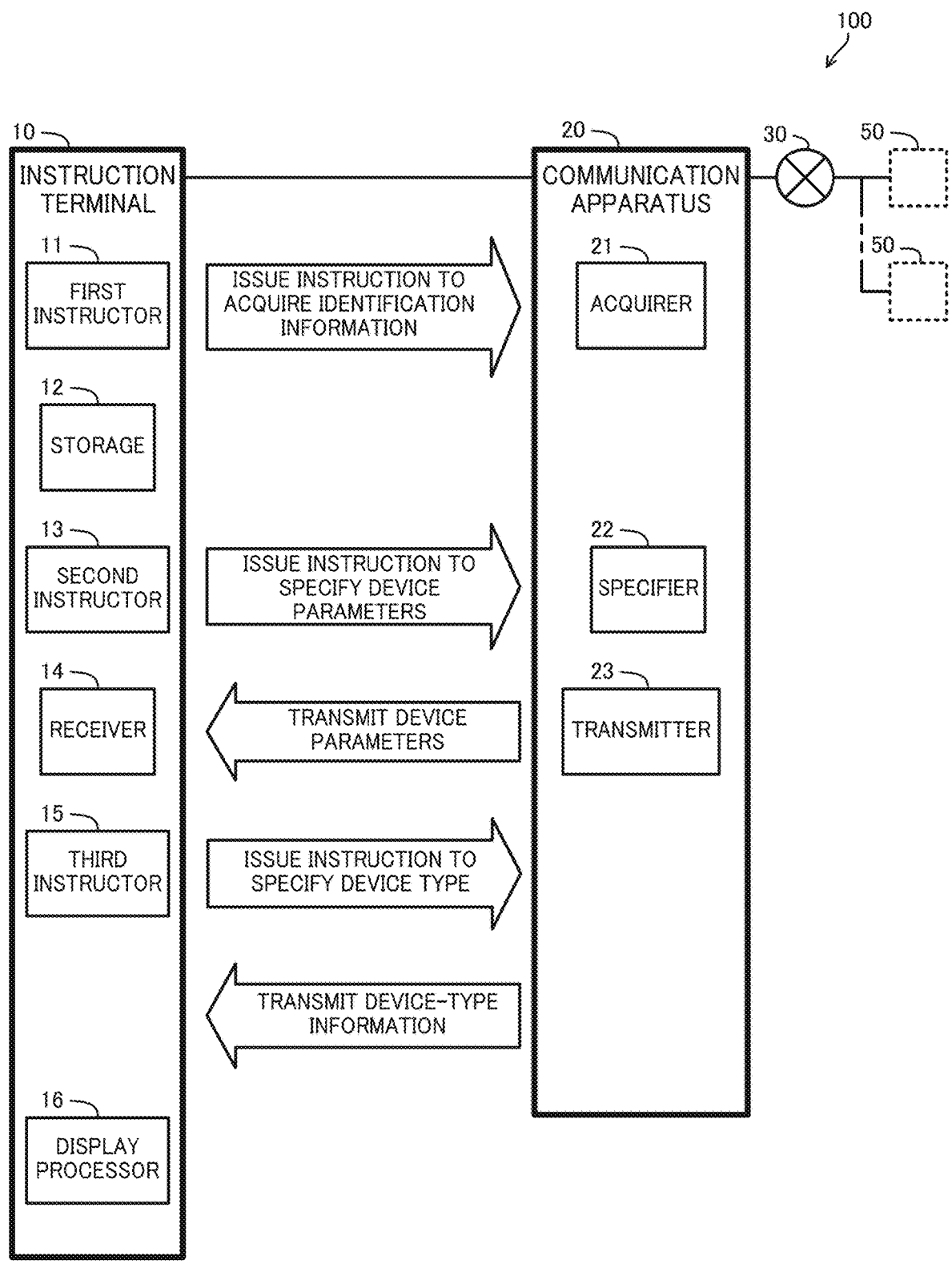
FIG. 3 illustrates functional configuration of the instruction terminal and the communication apparatus according to the embodiment.

The instruction terminal 10 and the communication apparatus 20, by cooperation among hardware components illustrated in FIG. 2, achieve various functions as illustrated in FIG. 3 for the communication apparatus 20 to automatically acquire information for communication with the network devices 41 and 42. The communication devices 50 illustrated in FIG. 3 are devices that are connected to the communication apparatus 20 via the network 30 but lack established communication with the communication apparatus 20. The communication apparatus 20, starting from a state in which parameters for communication with the communication devices 50 located opposite to the communication apparatus 20 to sandwich the network 30 are unknown, makes clear that the communication devices 50 are the network devices 41 and 42 by specifying the parameters in accordance with instructions from the instruction terminal 10, and sends notification of the parameters to the instruction terminal 10.

As illustrated in FIG. 3, the instruction terminal 10 includes a first instructor 11 that issues to the communication apparatus 20 an instruction to acquire the identification information of each of the network devices 41 and 42 that are the communication devices 50, a storage 12 that stores various types of information, a second instructor 13 that issues to the communication apparatus 20 an instruction to specify device parameters for communication with the network devices 41 and 42, a receiver 14 that receives information indicating the specified device parameters, a third instructor 15 that issues to the communication apparatus 20 an instruction to specify device types of the network devices 41 and 42, and a display processor 16 for displaying a screen by using the acquired device parameters and the device types. A specifier 22 of the communication apparatus 20 specifies the device types in accordance with instructions from the third instructor 15 of the instruction terminal 10, and a transmitter 23 of the communication apparatus 20 transmits device-type information indicating the specified device types to the instruction terminal 10. The receiver 14 of the instruction terminal 10 receives the device-type information.

The first instructor 11 is mainly achieved by cooperation between the processor 31 and the communicator 36 of the instruction terminal 10. The first instructor 11 issues, to the communication apparatus 20, an instruction to acquire the identification information of each of the network devices 41 and 42 that are communication devices 50 connected to the communication apparatus 20 via the network 30. Specifically, the first instructor 11 transmits to the communication apparatus 20 a command for starting search processing for searching for the communication devices 50 connected to the network 30. The first instructor 11 is an example of first instruction means, included in the instruction terminal 10, for issuing to a communication apparatus an instruction to acquire the identification information.

Figure 4:
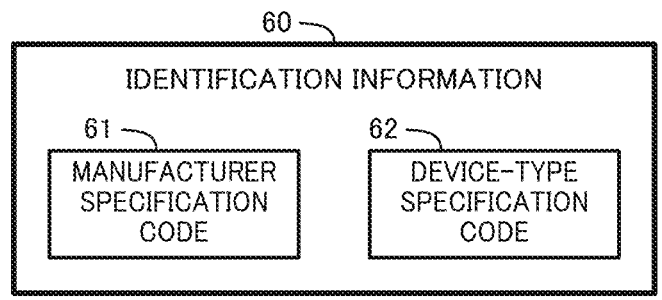
FIG. 4 illustrates identification information according to the embodiment.

The identification information is device identification information that is uniquely assigned to each communication device 50, and as illustrated in FIG. 4, includes a manufacturer specification code 61 for specifying a manufacturer of the corresponding communication device 50 and a device-type specification code 62 for specifying a device type of the corresponding communication device 50. Specifically, the identification information is an MAC address that contains, as the manufacturer specification code 61, three octets for identification of a vendor, and contains, as the device-type specification code 62, two octets for identification of a serial number. For example, the identification information "38:E0:8E:99:99:10" contains "38:E0:8E" that is the manufacturer specification code 61 and "99:99" that is the device-type specification code. Since specifying a manufacturer of each of the communication devices 50 enables narrowing down candidate parameters that are candidates of parameters for communication with the communication devices 50 to some extent, this identification information is utilized for specifying the parameters for communication with the communication device 50.

Figure 5:
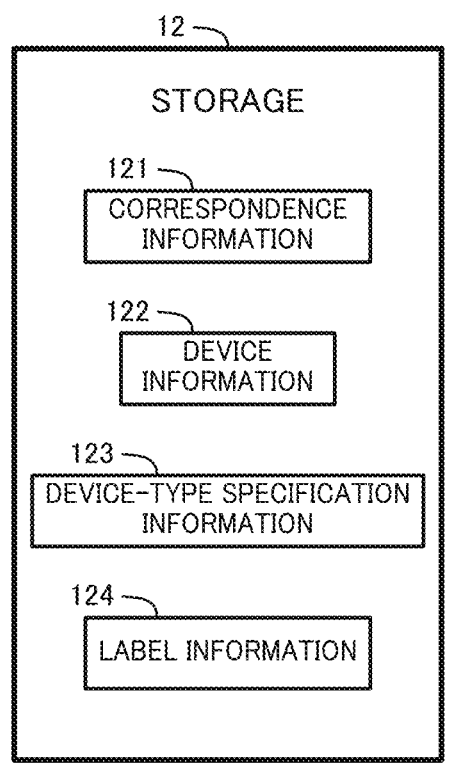
FIG. 5 illustrates information stored in a storage according to the embodiment.

Again with reference to FIG. 3, the storage 12 is a database management system (DBMS) that is mainly achieved by the auxiliary storage 33 of the instruction terminal 10. As illustrated in FIG. 5, the storage 12 stores (i) correspondence information 121 that associates, for each of the communication devices 50, (a) the identification information for identification of the communication device 50 and (b) candidate parameters that are candidates of parameters for communication with the communication device 50, (ii) device information 122 relating to the network devices 41 and 42, (iii) device-type specification information 123 for specifying the device types of the network devices 41 and 42, and (iv) label information 124 indicating labels to be displayed to the user 101. The storage 12 is an example of storage means, included in the instruction terminal 10, for storing information.

The correspondence information 121 is, as illustrated in FIG. 6, table format data that associates the identification information of each communication device 50, the manufacturer, and the candidate parameters, with one another. The identification information of the communication device 50 may be stipulated as a range by using a lower limit and an upper limit, as illustrated in FIG. 6. The manufacturer is a manufacturer name that corresponds to the manufacturer specification code 61 contained in the identification information. The candidate parameters include port numbers and communication protocols for communication with the communication device 50. According to the example illustrated in FIG. 6, a communication device 50 that holds the identification information that falls within the range from "38:E0:8E:00:00:00" to "38:E0:8E:FF:FF:FF" is manufactured by the manufacturer "MA" and has a function of communicating through any one of port numbers "5000", "5005", "1-4999" or "5010-65534" in accordance with any one of communication protocols "Pa1", "Pa2", or "Pa3". The correspondence information 121 as described above is stipulated in advance and stored in the storage 12.

The device information 122 is information relating to the network devices 41 and 42 that are the control targets. The device information 122 at first does not indicate particular information such as that indicated in the upper part of FIG. 7, since details of the communication devices 50 are unclear. According to the communication system 100 according to the present embodiment, the user need not manually set such device information 122. Updating the device information 122 to a state as illustrated in the lower part of FIG. 7, indicating parameters specified by the communication apparatus 20, achieves preparation for allowing the user 101 to determine control to the network devices 41 and 42 and for allowing the communication apparatus 20 and the network device 41 and 42 to achieve content of the determined control. The device information 122 is table format data that associates, for each of the network devices 41 and 42, a number assigned to the network device, an address, the identification information, the manufacturer, the specified device type, and the device parameters specified from among the candidate parameters, with one another.

Again with reference to FIG. 5, the device-type specification information 123 and the label information 124 are described later in detail.

Again with reference to FIG. 3, the second instructor 13 is mainly achieved by cooperation between the processor 31 and the communicator 36 of the instruction terminal 10. The second instructor 13 issues, to the communication apparatus 20, an instruction to specify, from among candidate parameters that are included in the correspondence information 121 and correspond to the identification information acquired in accordance with the instruction from the first instructor 11, the device parameters for communication with the network devices 41 and 42. Specifically, when notification of the identification information of the network devices 41 and 42 acquired by the communication apparatus 20 is sent to the instruction terminal 10, the second instructor 13 extracts the candidate parameters that are included in the correspondence information 121 and correspond to the identification information of the sent notification. Then the second instructor 13, with sending of notification of the extracted candidate parameters to the communication apparatus 20, issues an instruction to specify, from among the candidate parameters, device parameters enabling establishment of communication with the network devices 41 and 42. More specifically, the second instructor 13 transmits, to the communication apparatus 20, in addition to the candidate parameters, a command for starting parameter specifying processing for specifying the device parameters.

Although an example is described in which the second instructor 13 transmits the candidate parameters to the communication apparatus 20, this configuration is not limiting. The second instructor 13 may, with transmission of the correspondence information 121 to the communication apparatus 20, instruct the communication apparatus 20 to specify the device parameters by utilizing this correspondence information 121. The second instructor 13 is an example of second instruction means, included in the instruction terminal 10, for issuing to the communication apparatus 20 an instruction to specify the device parameters.

The receiver 14 is mainly achieved by the communicator 36 of the instruction terminal 10. The receiver 14 receives various types of information transmitted from the communication apparatus 20 to the instruction terminal 10. Specifically, the receiver 14 may receive the identification information of the network devices 41 and 42 that is acquired by the communication apparatus 20. Additionally, the receiver 14 receives, from the communication apparatus 20, parameter-specification information indicating the device parameters specified by the communication apparatus 20. Further, the receiver 14 receives, from the communication apparatus 20, the device-type information indicating the device types of the network devices 41 and 42 specified by the communication apparatus 20. The information that the receiver 14 receives from the communication apparatus 20 is not limited to the aforementioned information, and the receiver 14 may receive another type of information. The receiver 14 is an example of reception means, included in the instruction terminal 10, for receiving the parameter-specification information.

The third instructor 15 is mainly achieved by cooperation between the processor 31 and the communicator 36 of the instruction terminal 10. The third instructor 15, by utilizing the device-type specification information 123, instructs the communication apparatus 20 to send notification of the device types of the network devices 41 and 42 to the instruction terminal 10. FIG. 8 illustrates an example of the device-type specification information 123. As illustrated in FIG. 8, the device-type specification information 123 is information indicating, for each manufacturer, request data for requesting notification of a device type corresponding to the manufacturer, and is table format data that associates the manufacturer and the request data. For example, the communication device 50 corresponding to the manufacturer "MA", upon receipt of data "REQUEST DEVICE TYPE", makes a reply indicating a device type. The third instructor 15 sends, to the communication apparatus 20, the request data that is included in the device-type specification information 123 and corresponds to the manufacturer of each of the network devices 41 and 42. Then the third instructor 15 instructs the communication apparatus 20 to transmit the sent request data to the network devices 41 and 42. The third instructor 15 is an example of third instruction means, included in the instruction terminal 10, for issuing to the communication apparatus 20 an instruction to send notification of the device types of the network devices 41 and 42. The device-type specification information 123 is stipulated in advance and is stored in the storage 12.

Again with reference to FIG. 3, the display processor 16 is mainly achieved by the outputter 35 of the instruction terminal 10. The display processor 16 executes the display processing based on the device parameters and the device types that are specified by the communication apparatus 20. Specifically, the display processor 16 executes the display processing based on (i) the device parameters indicated by the parameter-specification information received by the receiver 14 and (ii) the device types of the network devices 41 and 42 that are indicated by the device-type information received by the receiver 14. The processing executed by the display processor 16 is described later in detail. The display processor 16 is an example of display processing means, included in the instruction terminal 10, for executing processing based on the device parameters and the device types.

The communication apparatus 20 includes an acquirer 21 that acquires the identification information from the network devices 41 and 42 in accordance with the instruction from the instruction terminal 10, the specifier 22 that, in accordance with the instructions from the instruction terminal 10, specifies the device parameters from among the candidate parameters and specifies the device types of the network devices 41 and 42, and the transmitter 23 that transmits, to the instruction terminal 10, the parameter-specification information indicating the specified device parameters and the device-type information indicating the specified device types.

The acquirer 21 is mainly achieved by cooperation between the processor 31 and the communicator 36 of the communication apparatus 20. The acquirer 21, in accordance with the instruction from the first instructor 11 of the instruction terminal 10, to each address on the network 30, transmits data requesting notification of the identification information. That is to say, the acquirer 21 acquires the identification information from the network devices 41 and 42 by transmitting the data that includes each of addresses within the range stipulated by the network 30 as a destination and that is for requesting notification of the identification information. Specifically, the acquirer 21 searches for the network devices 41 and 42 on the network 30 and acquires the identification information by (i) performing broadcast transmission of an address resolution protocol (ARP) request for requesting notification of the MAC address to each of IP addresses within the range that is stipulated by the IP address of the communication apparatus 20 itself and by a subnet mask of the network 30 that serves as a network segment and (ii) receiving an ARP reply. The ARP request is a request transmitted by communication that is available between devices even in a case in which the devices are different in communication protocols in the application layer while being unified with respect to communication protocols in lower layers such as the network interface layer, the internet layer, and transport layer. In a case in which IPv6 addresses are used, the acquirer 21 acquires the identification information by employment of, instead of the ARP request and the ARP reply, a neighbor discovery protocol (NDP) request and an NDP reply. The acquirer 21 is an example of acquisition means, included in the communication apparatus 20, for acquiring the identification information.

The specifier 22 is mainly achieved by cooperation between the processor 31 and the communicator 36 of the communication apparatus 20. The specifier 22, in accordance with the instruction from the second instructor 13 of the instruction terminal 10, by communications with respect to the network devices 41 and 42 that are performed by using the candidate parameters, specifies the device parameters based on whether a reply is made by the network devices 41 and 42 in response to each of the communications. Further, the specifier 22, by transmitting the request data to the network devices 41 and 42 in accordance with the instructions from the third instructor 15 of the instruction terminal 10, queries the network devices 41 and 42 with respect to device types. Then the specifier 22 specifies the device types of the network devices based on replies from the network devices 41 and 42 in response to the request data. The specifier 22 is an example of specifying means, included in the communication apparatus 20, for specifying the device parameters and the device types of the network devices 41 and 42.

The transmitter 23 is mainly achieved by the communicator 36 of the communication apparatus 20. The transmitter 23 transmits the identification information acquired by the acquirer 21 to the instruction terminal 10 and transmits the parameter-specification information and the device-type information to the instruction terminal 10. The transmitter 23 is an example of transmission means, included in the communication apparatus 20, for transmitting information to the instruction terminal 10.

Figure 9:
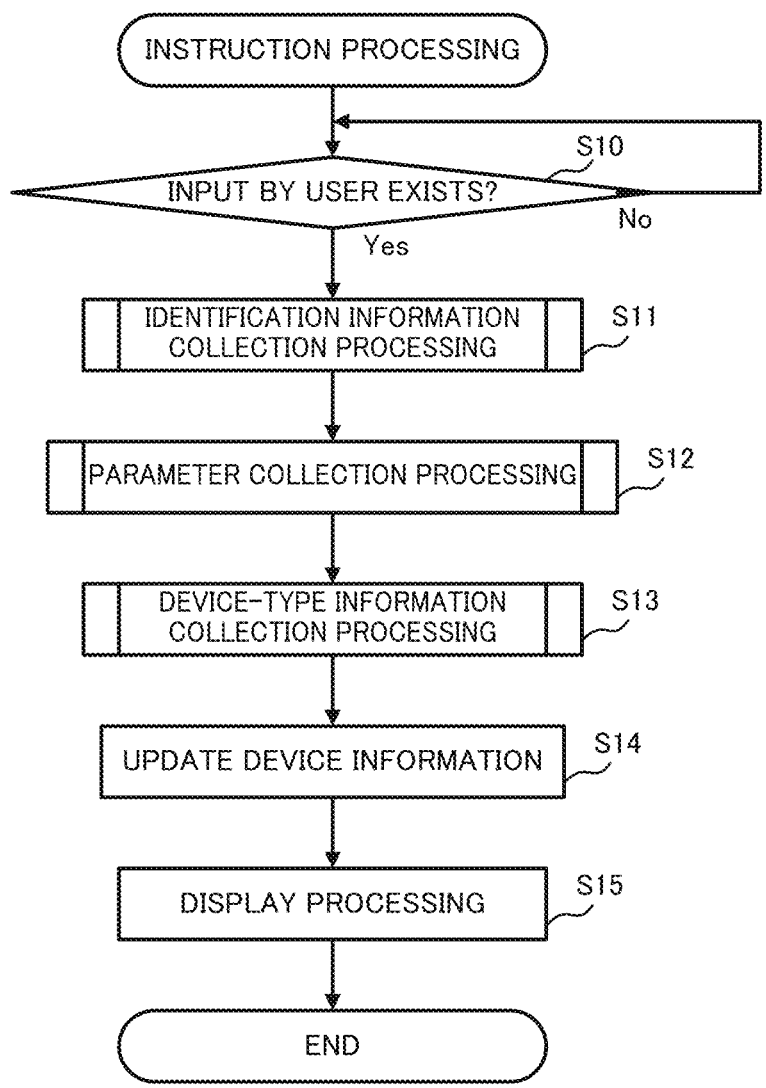
FIG. 9 is a flowchart of instruction processing according to the embodiment.

Next, processing executed by each of the instruction terminal 10 and the communication apparatus 20 is described with reference to FIGS. 9-18. FIG. 9 illustrates instruction processing executed by the instruction terminal 10.

In the instruction processing, the instruction terminal 10 determines whether input by the user 101 exists (step S10). Specifically, the instruction terminal 10 determines whether the user 101 inputs a command for causing the communication apparatus 20 to specify the device parameters. The input of this command may be execution of a command that is a character string stipulated in advance, or may be holding down a button for updating the device information 122.

When a determination is made that the input by the user 101 does not exist (NO in step S10), the instruction terminal 10 repeats the determining in step S10 and waits for input by the user 101. Conversely, when a determination is made that the input by the user 101 exists (YES in step S10), the instruction terminal 10 executes identification information collection processing (step S11). This identification information collection processing is processing for collecting the MAC addresses that serve as the identification information of the communication devices 50 existing on the network 30 and the IP addresses of the communication devices 50, and corresponds to execution of the instruction from the first instructor 11.

Figure 10:
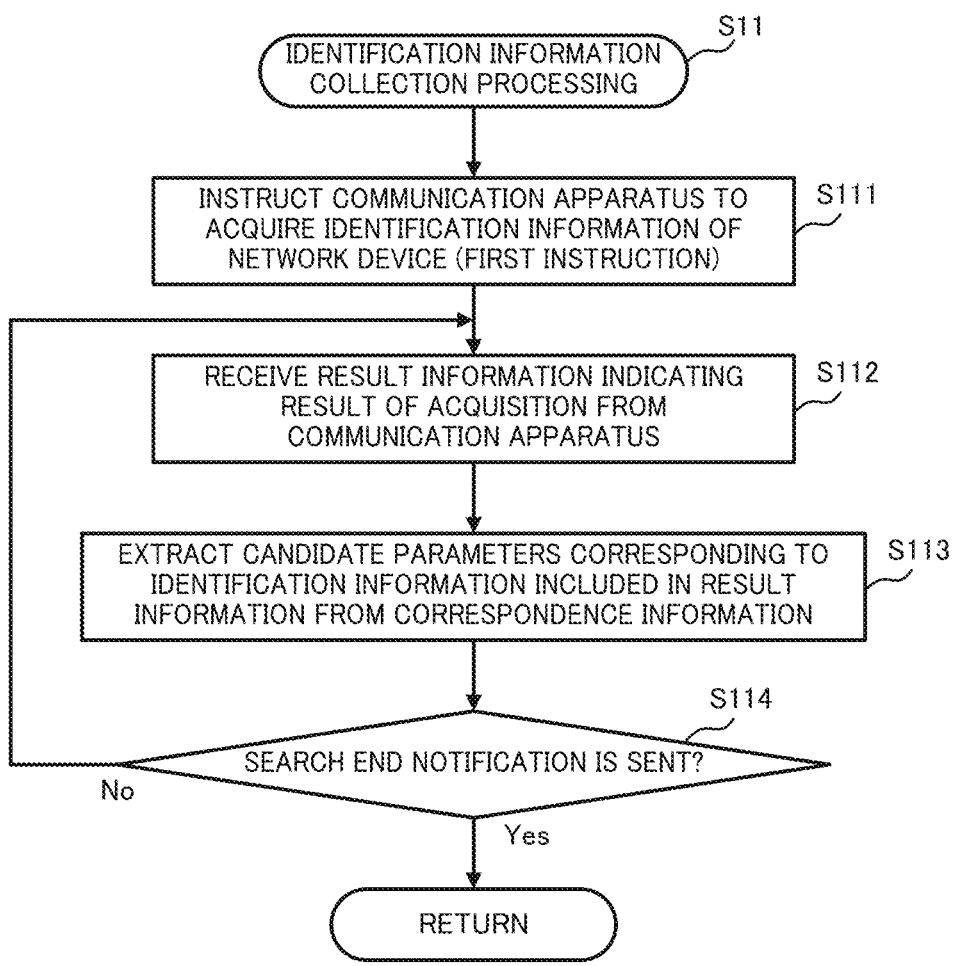
FIG. 10 is a flowchart of identification information collection processing according to the embodiment.

FIG. 10 illustrates details of the identification information collection processing. As illustrated in FIG. 10, in the identification information collection processing, the first instructor 11 instructs the communication apparatus 20 to acquire the identification information of each of the network devices 41 and 42 (step S111). Specifically, the first instructor 11 issues an instruction to acquire the identification information and the IP address of the network devices 41 and 42 that are communication devices 50 existing on the network 30.

Then the receiver 14 receives, from the communication apparatus 20, result information indicating a result of acquisition by the communication apparatus 20 (step S112). The result information is information that is transmitted from the communication apparatus 20 every time a device existing on the network 30 is discovered and that indicates the identification information and the IP address of the discovered device.

Then the first instructor 11 extracts the identification information contained in the result information received in step S112, and extracts the candidate parameters that are included in the correspondence information 121 and correspond to the extracted identification information (step S113).

Then the first instructor 11 determines whether the communication apparatus 20 sends search end notification (step S114). When a determination is made that the search end notification is not sent (NO in step S114), the instruction terminal 10 repeats the processing in step S112 and beyond. In the aforementioned manner, every time the communication device 50 existing on the network 30 is discovered, the instruction terminal 10 obtains the identification information and the IP address of the discovered communication device 50 that is the network device 41 or the network device 42. When a determination is made in step S114 that the search end notification is sent (YES in step S114), the processing executed by the instruction terminal 10 returns, from the identification information collection processing illustrated in FIG. 10, to the instruction processing illustrated in FIG. 9.

Again with reference to FIG. 9, following step S11, the instruction terminal 10 executes parameter collection processing (step S12). This parameter collection processing is processing for collecting the device parameters for communication with the network devices 41 and 42 and corresponds to execution of the instruction from the second instructor 13.

Figure 11:
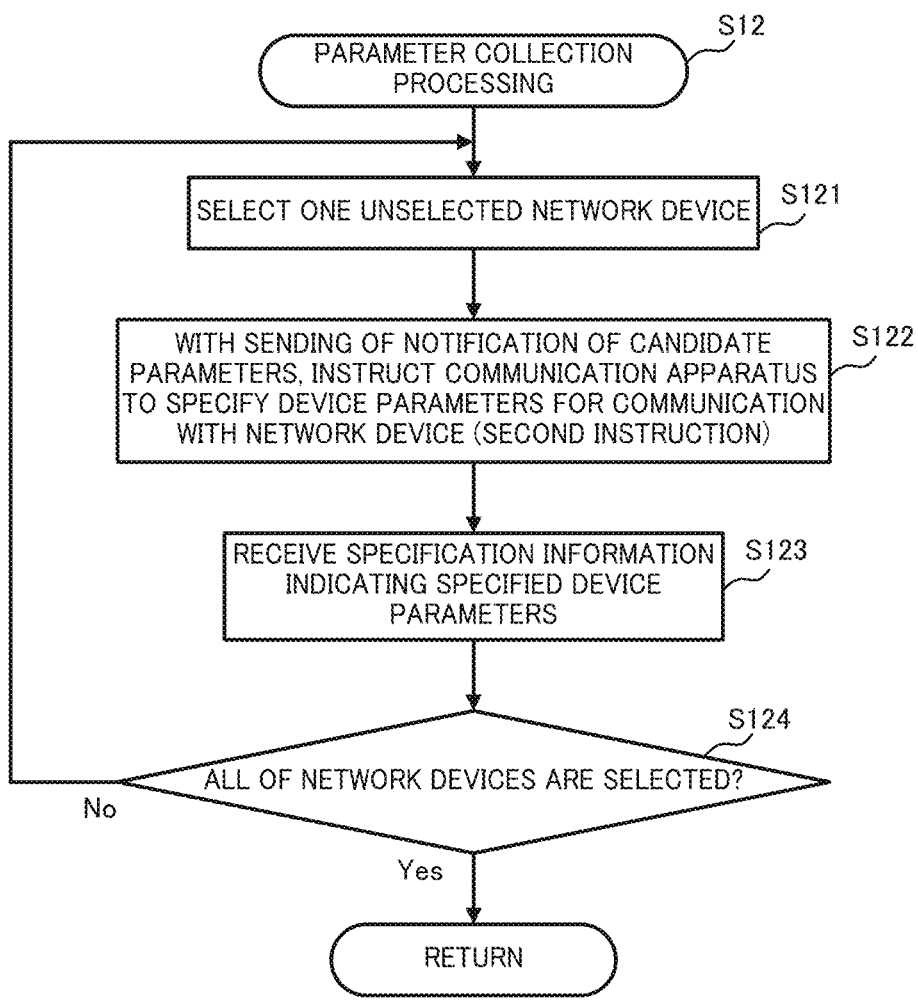
FIG. 11 is a flowchart of parameter collection processing according to the embodiment.

FIG. 11 illustrates details of the parameter collection processing. As illustrated in FIG. 11, in the parameter collection processing, the second instructor 13 selects one unselected network device (step S121). Specifically, the second instructor 13 selects, from among network devices corresponding to the identification information collected in the identification information collection processing of FIG. 10, any one of the devices.

Then the second instructor 13 with sending to the communication apparatus 20 of notification of the candidate parameters corresponding to the network device selected in step S121, instructs the communication apparatus 20 to specify the device parameters for communication with the network device (step S122). The candidate parameters of the network device are the candidate parameters extracted in step S113 of FIG. 10.

Then the receiver 14 receives, from the communication apparatus 20, the parameter-specification information indicating the specified device parameters (step S123). This enables obtaining by the instruction terminal 10 of the device parameters for communication with the network device selected in step S121.

Then the second instructor 13 determines whether all of the network devices are heretofore selected (step S124). Specifically, the second instructor 13 determines whether network devices corresponding to the respective identification information acquired until the search end notification is sent in the identification information collection processing of FIG. 10 are selected.

When a determination is made that not all of the network devices are heretofore selected (NO in step S124), the instruction terminal 10 repeats the processing in step S121 and beyond. This enables specifying the device parameters for each network device and collecting by the instruction terminal 10 of the device parameters for each network device. Conversely, when a determination is made that all of the network devices are heretofore selected (YES in step S124), the processing executed by the instruction terminal 10 returns, from the parameter collection processing illustrated in FIG. 11, to the instruction processing illustrated in FIG. 9.

Again with reference to FIG. 9, following step S12, the instruction terminal 10 executes device-type information collection processing (step S13). This device-type information collection processing is processing for collecting the device types of the network devices 41 and 42 and corresponds to execution of the instructions from the third instructor 15.

Figure 12:
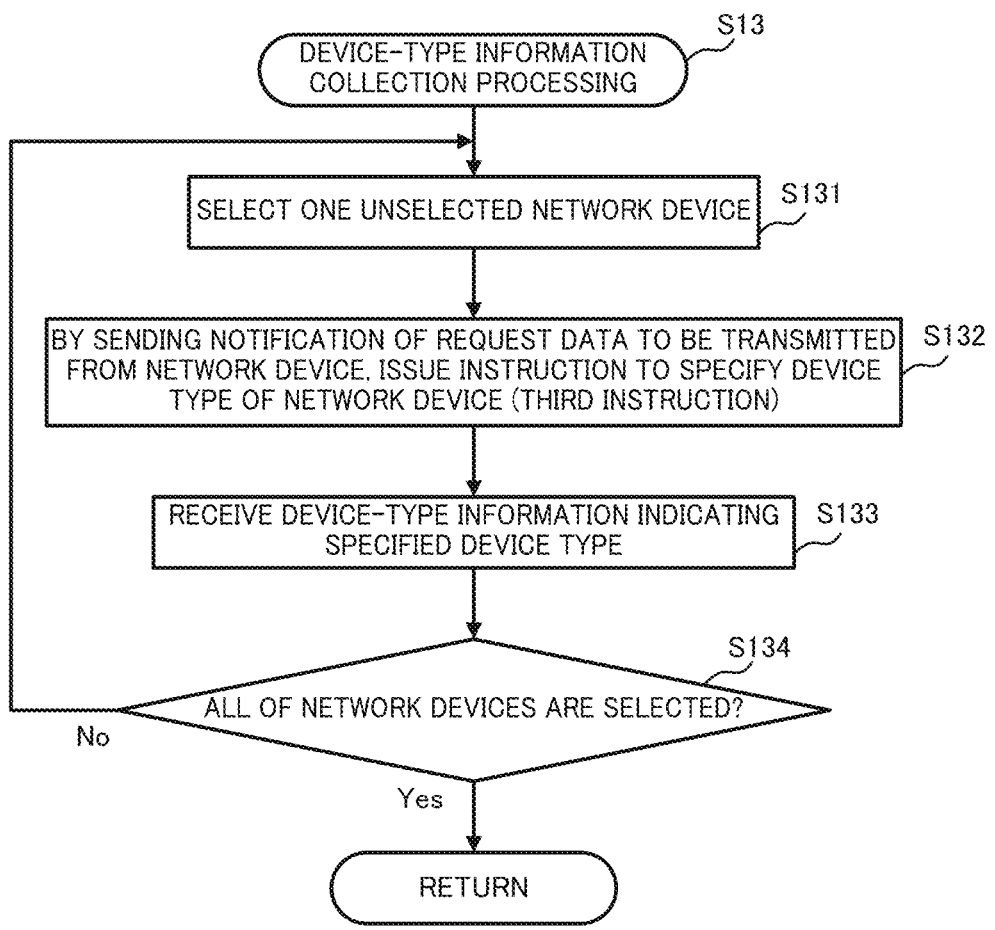
FIG. 12 is a flowchart of device-type information collection processing according to the embodiment.

FIG. 12 illustrates details of the device-type information collection processing. In the device-type information collection processing, the third instructor 15 selects one unselected network device (step S131). Specifically, the third instructor 15 selects, from among the network devices corresponding to the identification information collected in the identification information collection processing of FIG. 10, any one of the devices.

Then the third instructor 15, by sending notification of the request data to be transmitted to the selected network device, instructs the communication apparatus 20 to specify the device type of the network device (step S132). Specifically, the third instructor 15 reads the request data included in the device-type specification information 123 and corresponding to the identification information of the network device selected in step S131, and transmits this request data to the communication apparatus 20.

Then the receiver 14 receives the device-type information indicating the device type of the network device specified by the communication apparatus 20 (step S133). This enables obtaining by the instruction terminal 10 of the device type of the network device selected in step S131.

Then the third instructor 15 determines whether all of the network devices are heretofore selected (step S134). Specifically, the third instructor 15 determines whether all of the network devices corresponding to the identification information collected in the identification information collection processing of FIG. 10 are selected.

When a determination is made that not all of the network devices are heretofore selected (NO in step S134), the instruction terminal 10 repeats the processing in step S131 and beyond. This enables collecting by the instruction terminal 10 the device-type information indicating the device type of each network device. Conversely, when a determination is made that all of the network devices are heretofore selected (YES in step S134), the processing executed by the instruction terminal 10 returns, from the device-type information collection processing illustrated in FIG. 12, to the instruction processing illustrated in FIG. 9.

Figure 7:
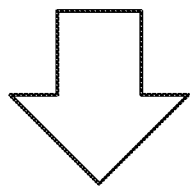
FIG. 7 illustrates device information according to the embodiment.

Again with reference to FIG. 9, following step S13, the instruction terminal 10 updates the device information 122 based on the information collected in steps S11, S12, and S13 (step S14). This updates the device information 122 as illustrated in FIG. 7.

Then the instruction terminal 10 executes display processing (step S15). Specifically, the display processor 16, by utilizing the device information 122 and the label information 124, displays to the user 101 a screen for determining content of control.

Figure 13:
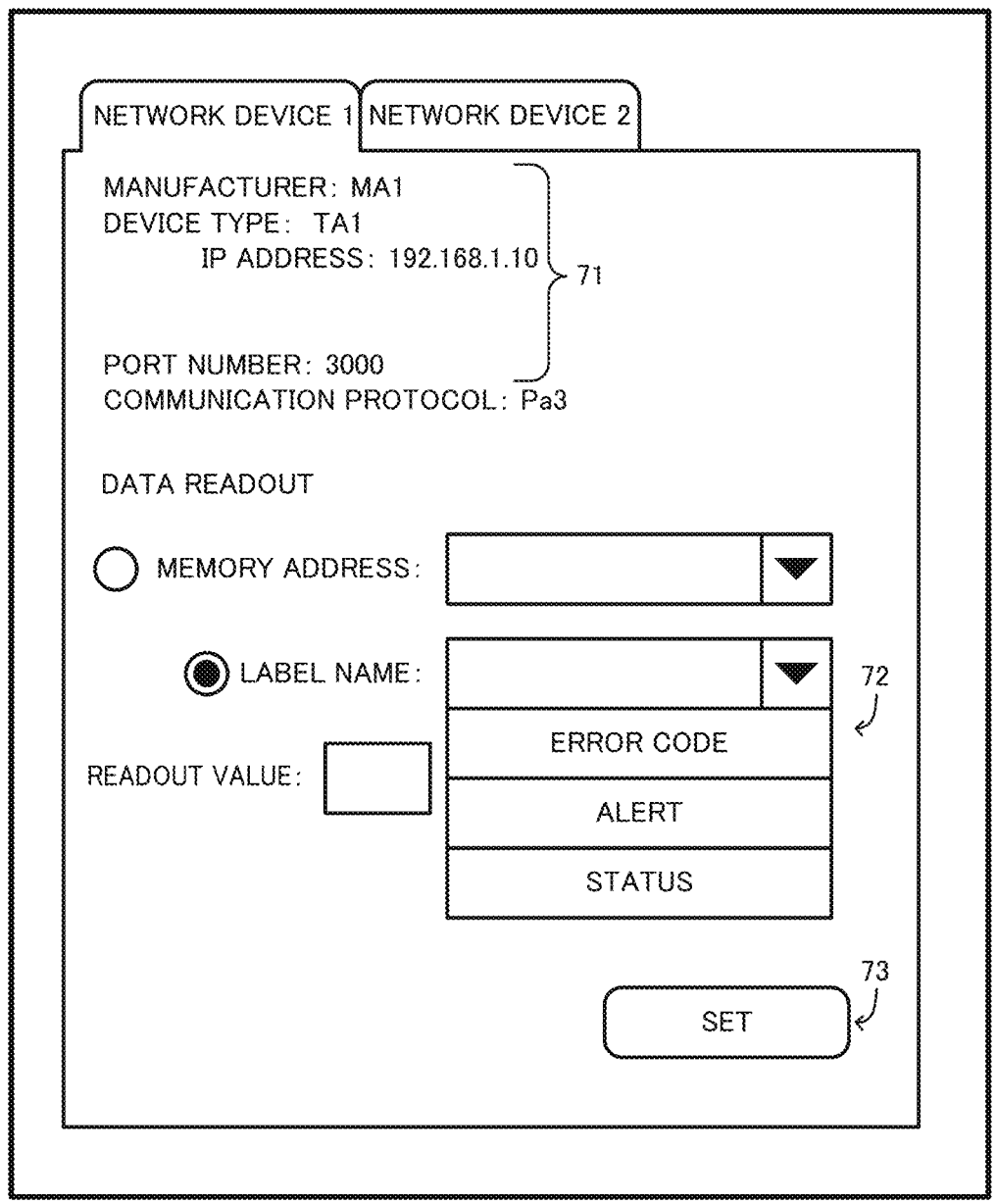
FIG. 13 illustrates a screen displayed on the instruction terminal according to the embodiment.

FIG. 13 illustrates an example of the screen displayed by the display processor 16. The screen illustrated in FIG. 13 is a screen via which setting for reading data from the network devices is inputted. This screen, as illustrated in FIG. 13, contains an area 71 for displaying content of the device information 122, label names 72 relating to the network devices, and a setting button 73 for completion of setting. The label names 72 are names corresponding to addresses of memories included in the network devices and are generated from the label information 124. FIG. 14 illustrates an example of the label information 124. As illustrated in FIG. 14, the label information 124 is table format data that associates with one another manufacturers of the communication devices, device types of the communication devices, addresses of memories included in the communication devices corresponding to the device types, and labels indicating types of data stored in the addresses. The display processor 16 reads, from this label information, labels associated with the device type of the network device, and displays the labels as the label names 72.

When the user 101 selects any one of the label names 72 and completes the setting by using the setting button 73, the IP address of the network device 41 indicated as "network device 1" in FIG. 13, the port number "3000", the communication protocol "Pa3" in the application layer, an address of the memory for reading a value from the memory of the network device 41, and a memory address corresponding to the label name, are set for the communication apparatus 20. For example, selecting "error code" in FIG. 13 as the label name 72 leads to setting the communication apparatus 20 to read data, via the network 30 and the communication apparatus 20, from the address "X100" that corresponds to "error code" as illustrated in FIG. 14.

Again with reference to FIG. 9, after step S15, the instruction processing ends.

Next, specifying processing executed by the communication apparatus 20 is described with reference to FIG. 15. In the specifying processing, the communication apparatus 20 executes the search processing in accordance with a first instruction from the instruction terminal 10 (step S21). This search processing is processing for searching for the network devices existing on the network 30.

Figure 16:
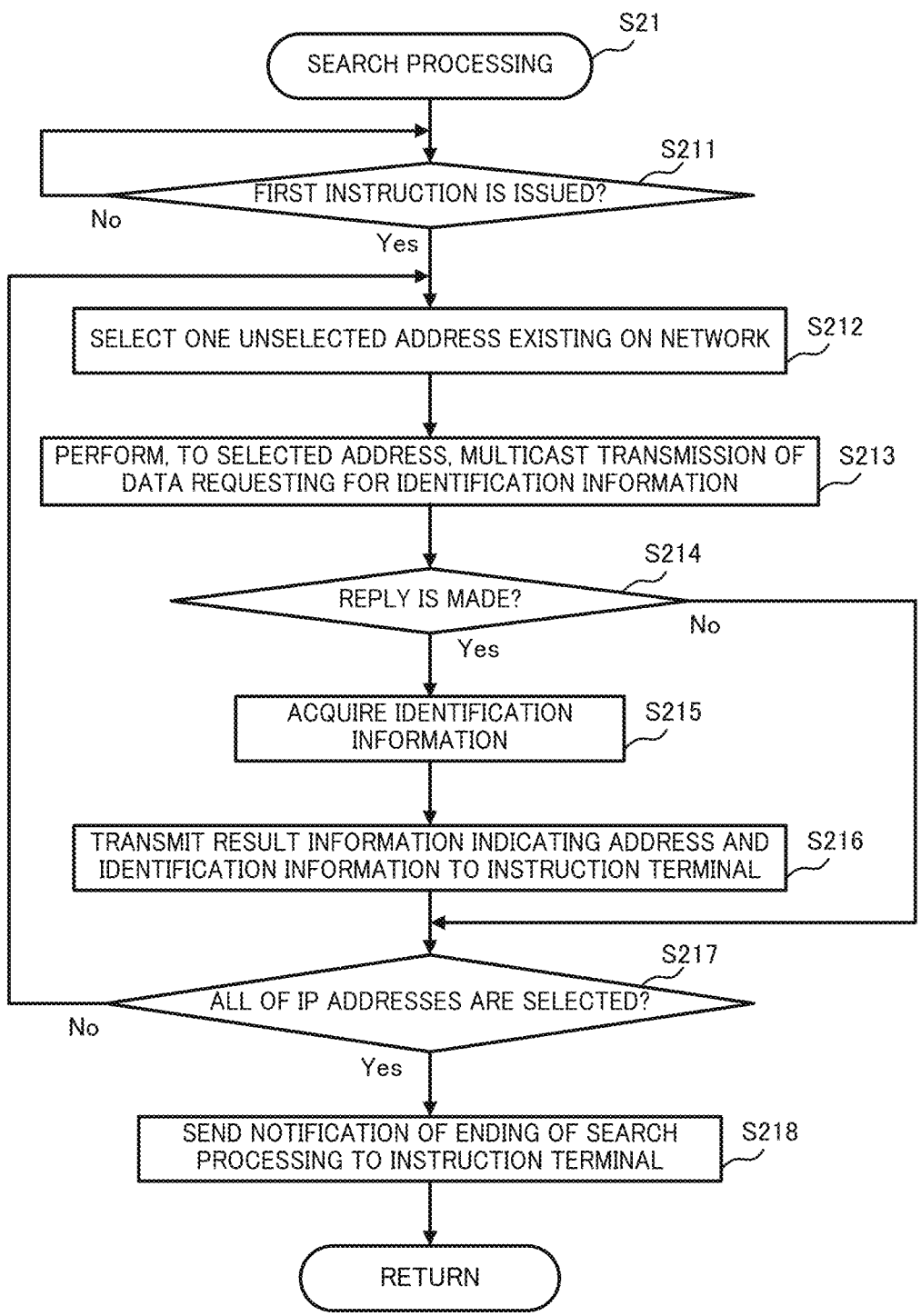
FIG. 16 is a flowchart of search processing according to the embodiment.

FIG. 16 illustrates details of the search processing. In the search processing, the acquirer 21 determines whether the first instruction is issued from the instruction terminal 10 (step S211). Specifically, the acquirer 21 determines whether the instruction in step S111 of the identification information collection processing of FIG. 10 is received within a predetermined time period. The predetermined time period is, for example, 100 milliseconds or five seconds.

When a determination is made that the first instruction is not issued (NO in step S211), the acquirer 21 repeats determining in step S211 and waits until the first instruction is issued. Conversely, when a determination is made that the first instruction is issued (YES in step S211), the acquirer 21 selects one IP address from among unselected IP addresses existing on the network 30 (step S212). When, for example, the range of IP addresses on the network 30 is from "192.168.1.1" to "192.168.255.255", the acquirer 21 selects any one of the IP addresses that fall within this range.

Then the acquirer 21 performs, on the network 30, to the IP address selected in step S212, multicast transmission of data requesting for the identification information (step S213). Specifically, the acquirer 21 performs broadcast transmission of the ARP request or the NDP request, to the device corresponding to the selected IP address, to make a request for the identification information.

Then the acquirer 21 determines whether a reply is made in response to the data transmission in step S213 (step S214). In a case in which a device that is assigned the IP address to which the data is transmitted in step S213 does not exist, no reply is made by the devices existing on the network 30, leading to a negative determination in step S214. Conversely, in a case in which a device that is assigned the IP address to which the data is transmitted in step S213 exists, the device that is assigned the IP address replies by sending notification of the identification information to the communication apparatus 20, leading to a positive determination in step S214.

When a determination is made that no reply is made (NO in step S214), the acquirer 21 shifts the processing to step S217. Conversely, when a determination is made that a reply is made (YES in step S214), the acquirer 21 acquires the identification information from the reply (step S215).

The transmitter 23 transmits, to the instruction terminal 10, the result information indicating the IP address selected in step S212 and the identification information acquired in step S215 (step S216). This results in sending, to the instruction terminal 10, notification of the IP address of the network device existing on the network 30 and the identification information.

Then the acquirer 21 determines whether all of the IP addresses are heretofore selected (step S217). When a determination is made that not all of the IP addresses are heretofore selected (NO in step S217), the acquirer 21 repeats the processing in step S212 and beyond. This enables searching of a next network device existing on the network 30. Conversely, when a determination is made that all of the IP addresses are heretofore selected (YES in step S217), the communication apparatus 20 sends, to the instruction terminal 10, notification of ending of the search processing (step S218). Thereafter, the processing executed by the communication apparatus 20 returns, from the search processing illustrated in FIG. 16, to the specifying processing illustrated in FIG. 15.

Again with reference to FIG. 15, following step S21, the communication apparatus 20 executes the parameter specifying processing (step S22). The parameter specifying processing is processing for specifying the device parameters that each are for communication with a corresponding network device of the network devices searched for in the search processing in step S21.

FIG. 17 illustrates details of the parameter specifying processing. In the parameter specifying processing, the specifier 22 determines whether a second instruction is issued from the instruction terminal 10 (step S212). Specifically, the specifier 22 determines whether the instruction in step S122 of the parameter collection processing of FIG. 11 is received within a predetermined time period. The predetermined time period is, for example, 100 milliseconds or five seconds.

Figure 15:
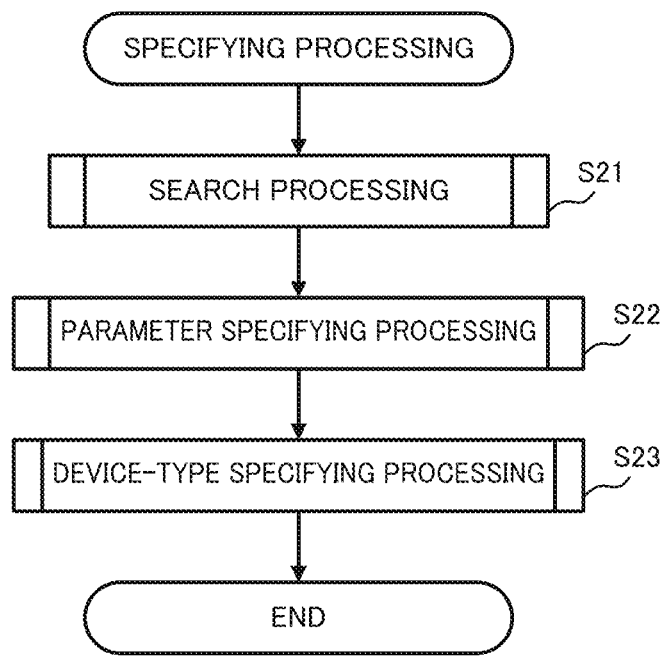
FIG. 15 is a flowchart of specifying processing according to the embodiment.

When a determination is made that the second instruction is not issued (NO in step S221), the processing by the communication apparatus 20 returns, from the parameter specifying processing of FIG. 17, to the specifying processing of FIG. 15. Conversely, when a determination is made that the second instruction is issued (YES in step S221), the specifier 22 acquires port numbers and protocols as candidate parameters corresponding to the network device for which the device parameters are to be specified (step S222). Specifically, the specifier 22 acquires the candidate parameters included in the instruction determined to exist in step S221.

Then the specifier 22 selects one unselected protocol from among the candidate parameters (step S223). For example, in a case of specifying the device parameters corresponding to the network device 41, the manufacturer is "MA", and thus notification of candidate parameters 80 in FIG. 6 is sent to the specifier 22 as the candidate parameters corresponding to the network device 41. The specifier 22 selects, from among the candidate parameters, a protocol that is a head protocol among unselected protocols. Specifically, the specifier 22 selects the protocol "Pa1" from among the candidate parameters of FIG. 6.

Then the specifier 22 selects one unselected port number from among the candidate parameters (step S224). For example, the specifier 22 selects, from among the candidate parameters, the port number "5000" that is a head port number among unselected port numbers.

Then the specifier 22 transmits data to the port number selected in step S224 with the protocol selected in step S223 (step S224). Specifically, the specifier 22 transmits data, to the selected port number of the target network device, in accordance with a communication protocol that is a candidate protocol in the application layer (step S225). This data is data for determining whether the port is open and for specifying, from among the candidates, a communication protocol in the application layer.

Then the specifier 22 determines whether a reply is made in response to the data transmitted in step S225 (step S226). Closed state of a port of the target network device leads to no response from such port, whereas open state of this port leads to receipt of a reply from such port.

When a determination is made that no reply is made (NO is step S226), the specifier 22 determines whether all of the port numbers included in the candidate parameters are heretofore selected (step S227). Specifically, the specifier 22 determines whether a currently-selected port number is the last port number among port numbers stipulated in the candidate parameters.

When a determination is made that not all of the port numbers are heretofore selected (NO in step S227), the specifier 22 repeats the processing in step S224 and beyond. This enables repetitive test communication by combination of the protocol selected in step S223 and a new port number, leading to continuation of searching for a valid parameter.

Conversely, when a determination is made that all of the port numbers are heretofore selected (YES in step S227), the specifier 22 repeats the processing in step S223 and beyond. This enables repetitive test communication by combination of a new protocol and the port numbers included in the candidate parameters, leading to continuation of searching for a valid parameter.

When a determination is made in step S226 that a reply is made (YES in step S226), the specifier 22 specifies the selected protocol and port number as the device parameters (step S228). This enables scanning for a protocol and a port number that enable communication with the target network device.

Then the transmitter 23 transmits, to the instruction terminal 10, the parameter-specification information indicating the specified device parameters (step S229). This allows the instruction terminal 10 to obtain the device parameters for communication with the target network device. Thereafter, the communication apparatus 20 repeats the processing in step S221 and beyond. This specifies the device parameters corresponding to a next target network device.

Again with reference to FIG. 15, following step S22, the communication apparatus 20 executes device-type specifying processing (step S23). The device-type specifying processing is processing for specifying a device type for each of the network devices searched for in the search processing in step S21.

FIG. 18 illustrates details of the device-type specifying processing. In the device-type specifying processing, the specifier 22 determines whether a third instruction is issued from the instruction terminal 10 (step S231). Specifically, the specifier 22 determines whether the instruction in step S132 of the device-type information collection processing of FIG. 12 is received within a predetermined time period. The predetermined time period is, for example, 100 milliseconds or five seconds.

When a determination is made that the third instruction is not issued (NO in step S231), the processing by the communication apparatus 20 returns, from the device-type specifying processing of FIG. 18, to the specifying processing of FIG. 15. Conversely, when a determination is made that the third instruction is issued (YES in step S231), the specifier 22 acquires from the instruction terminal 10 the request data to be transmitted to the target network device (step S232).

Then the specifier 22 transmits the request data to the target network device (step S233), and receives from the network device a reply indicating a device type (step S234). The transmitter 23 transmits to the instruction terminal 10 the device-type information indicating the device type of the network device (step S235). This allows the instruction terminal 10 to obtain a device type of the target network device. Thereafter, the communication apparatus 20 repeats the processing in step S231 and beyond. This enables specifying a device type of a next target network device and sending notification of the device type to the instruction terminal 10.

Again with reference to FIG. 15, following step S23, the communication apparatus 20 ends the specifying processing.

Next, flow of data transmitted in the communication system 100 are described with reference to FIGS. 19-22. FIG. 19 illustrates flow of data when the instruction terminal 10 executes the identification information collection processing and the communication apparatus 20 executes the search processing.

As illustrated in FIG. 19, the instruction terminal 10 sends the first instruction to the communication apparatus 20 (step S51). Then the communication apparatus 20 sends a request for the identification information to the IP address "192.168.1.1" (step S52). Since broadcast transmission of this request is performed on the network 30, each of the network devices 41 and 42 receives this request. However, the addresses held by the network devices 41 and 42 are different from "192.168.1.1", and thus none of the network devices 41 and 42 make a reply.

Then the communication apparatus 20 repeats the sending of the request for the identification information by changing the IP address to "192.168.1.2". Changing of the IP address is performed sequentially in this manner, to send the request for the identification information repeatedly.

In a case in which the communication apparatus 20 sends the request to the IP address "192.168.1.10", since this IP address corresponds to the address of the network device 41, the network device 41 makes a reply by sending notification of the identification information (step S53). The communication apparatus 20, upon receipt of the reply, transmits to the instruction terminal 10 the result information indicating the IP address from which the reply is received and the identification information (step S54). The instruction terminal 10 extracts the candidate parameters corresponding to the network device 41 by reading the correspondence information 121 and checking such against the identification information for which the notification is sent (step S55).

In a manner similar to the aforementioned manner, the communication apparatus 20 transmits to the instruction terminal 10 the result information indicating the identification information and the IP address of the network device 42, and the instruction terminal 10 extracts the candidate parameters corresponding to the network device 42. When the request for the identification information is sent to the last IP address "192.168.1.255" and no reply is made, the communication apparatus 20 sends the search end notification to the instruction terminal 10, leading to ending of the identification information collection processing and the search processing.

FIG. 20 illustrates flow of data when, for the network device 41, the instruction terminal 10 executes the parameter collection processing and the communication apparatus 20 executes the parameter specifying processing. As illustrated in FIG. 20, the instruction terminal 10 sends the second instruction to the communication apparatus 20 (step S61). This instruction includes the identification information, the IP address, and the candidate parameters that correspond to the network device 41 for which parameters are to be specified.

Then the communication apparatus 20 performs testing on whether communication with the network device 41 is established by the candidate parameters, by transmitting data to the network device 41 while performing one-by-one selection of the candidate parameters in an order stipulated in the correspondence information 121. When no reply is made and communication is not established, the next candidate parameter is selected to perform repetitive testing. Due to this, testing for communication, by using a candidate parameter that is a head candidate parameter in the correspondence information 121, is performed with priority over testing for communication by using candidate parameters subsequent to the head candidate parameter. Thus, in a case in which communication is established by any of multiple candidate parameters included in the correspondence information 121, selection of a candidate parameter that is stipulated ahead of other candidate parameters in the correspondence information 121 is prioritized.

Specifically, the communication apparatus 20 selects the port number "5000" described at the head and the port number "Pa1" described at the head from among data indicating the candidate parameters, and transmits data to the selected port number in accordance with the selected protocol (step S62). Then the communication apparatus 20 determines whether a reply is made from the network device 41 in response to the transmitted data.

When no reply is made from the network device 41, the communication apparatus 20 selects "5005" that is the next-described port number of the candidate parameters while maintaining the protocol, transmits data (step S63), and determines whether a reply is made. When no reply is made from the network device 41, the communication apparatus 20 performs test communication by a port number subsequent to the next port number in a manner similar to the aforementioned manner, to perform repetitive test communication.

When no reply is made in response to data transmission in which "65534" that is the port number described at the last of the candidate parameters is selected, (step S64), the communication apparatus 20 selects "Pa2" that is the next-described protocol of the candidate parameters, and performs test communication while performing one-by-one selection of the port numbers in the order from the head port number, to perform repetitive test communication (steps S65-S66).

When a reply is made from the network device 41 (step S67), the communication apparatus 20 determines that the currently-selected port number and protocol enable communication with the network device 41, and specifies such port number and protocol as the device parameters. Thereafter, the communication apparatus 20 transmits to the instruction terminal 10 the parameter-specification information indicating the device parameters corresponding to the network device 41 (step S68).

FIG. 21 illustrates flow of data when, for the network device 42, the instruction terminal 10 executes the parameter collection processing and the communication apparatus 20 executes the parameter specifying processing. The flow illustrated in FIG. 21 corresponds to flow obtained by replacing in FIG. 20 the network device 41 with the network device 42.

FIG. 22 illustrates flow of data when the instruction terminal 10 executes the device-type information collection processing and the communication apparatus 20 executes the device-type specifying processing.

As illustrated in FIG. 22, when the instruction terminal 10 instructs the communication apparatus 20 to specify a device type of the network device 41 (step S71), the communication apparatus 20 sends a request to the network device 41 for requesting notification of the device type (step S72). The network device 41 sends a reply indicating the device type (step S73), and the communication apparatus 20 transmits to the instruction terminal 10 the device-type information indicating the device type of the network device 41 (step S74).

Similarly, when the instruction terminal 10 issues an instruction to specify a device type of the network device 42 (step S75), the communication apparatus 20 sends a request to the network device 42 for the device type (step S76), and the communication apparatus 20 receives a reply from the network device 42 (step S77) and transmits the device-type information indicating the device type of the network device 42 (step S78). Then the instruction terminal 10 updates the device information 122 (step S79) and executes the display processing (step S80).

As described above, the specifier 22 of the communication apparatus 20 specifies the device parameters for communication with the network devices 41 and 42, and the receiver 14 of the instruction terminal 10 receives from the communication apparatus the parameter-specification information indicating the specified device parameters. This configuration eliminates the need by the user 101 to prepare information relating to each of the network devices 41 and 42 in advance, and accordingly eliminates the need by the user 101 to set to the communication apparatus 20 information relating to the IP addresses, the port numbers, the communication protocols in the application layer, leading to reduction in workload imposed on the user.

Furthermore, since the communication apparatus 20 executes the control processing, consumption of calculation resources other than the control processing is undesirable. The second instructor 13 according to the aforementioned embodiment, with sending of notification of the candidate parameters to the communication apparatus 20, instructs the communication apparatus 20 to specify the device parameters. Since the processing for extracting the candidate parameters from the correspondence information 121 is executed by the instruction terminal 10, the communication apparatus 20 need not include a memory for storing the correspondence information 121 and need not be equipped with calculation resources for extracting the candidate parameters.

Furthermore, the acquirer 21 acquires the identification information from the network devices 41 and 42 by transmitting the data that includes each of addresses within the network 30 as a destination and that is for requesting notification of the identification information. This configuration allows, even in a state in which information relating to the communication devices 50 existing on the network 30 is unclear, the communication apparatus 20 to acquire the identification information corresponding to the network devices 41 and 42.

Furthermore, the specifier 22, in the communications with respect to the network devices 41 and 42 that are performed by using the candidate parameters, specifies the device parameters based on whether a reply is made by the network devices in response to each of the communications. This configuration enables efficient specification of the device parameters by using the candidate parameters that are prepared in advance.

Furthermore, in the case of associating the identification information and multiple candidate parameters in the correspondence information 121, the correspondence information 121 stipulates the multiple parameters in descending order of priority for employment of the device parameters. Thus, in a case in which communications with the network devices 41 and 42 are established by any of the multiple candidate parameters, the specifier 22 specifies, as the device parameters, candidate parameters that are higher in the priority than other candidate parameters. This configuration allows the user 101, by changing the order in which the candidate parameters are stipulated in the correspondence information 121, to freely set the priorities for the candidate parameters.

Defining the priorities for the candidate parameters in the correspondence information 121 is not limited to defining in an order. For example, the correspondence information 121 may be information that associates each of the multiple candidate parameters and a priority level that is one of a priority level "high" or a priority level "low". This priority level may provide classification into "high" or "low" as described above, or may be a numerical value that decreases with increase in the priority. Further, the priority is not necessarily set for all of the multiple candidate parameters. The multiple candidate parameters may be any parameters that include a priority parameter that is higher in priority than the other parameters. For example, the configuration may be employed in which only one candidate parameter of the multiple candidate parameters is higher in priority than candidate parameters other than the one candidate parameter. Further, the priority level of the candidate parameter is not necessarily indicated in the correspondence information 121. For example, the specifier 22 may specify the device parameters by prioritizing extraction from the correspondence information 121 of candidate parameters that are predefined to be prioritized and by performing test communication by the candidate parameters, or may specify the device parameters by extracting the candidate parameters from the correspondence information 121 in a predefined order and by performing test communication in the order.

Furthermore, the specifier 22 specifies the device types of the network devices 41 and 42, and the instruction terminal 10 acquires the device-type information indicating the device types of the network devices 41 and 42. Making the device types of the network devices 41 and 42 clear allows the user 101 to easily grasp memory configuration and functions corresponding to the device types, and also allows the instruction terminal 10 to execute processing corresponding to the device types. For example, the instruction terminal 10 may display, for each of the device types of the network devices 41 and 42, a UI screen for inputting operations to a corresponding network device by the user 101.

Furthermore, the display processor 16 executes the display processing based on the labels included in the label information 124 and corresponding to the device types indicated by the device-type information. This configuration allows the user 101 to perform setting for the control processing by utilizing as illustrated in FIG. 13, instead of an address value corresponding to a memory, or in addition to the address value, a label that is easy to understand.

Although an embodiment of the present disclosure is described above, the present disclosure is not limited to the aforementioned embodiment.

For example, the processing executed by utilizing the device information 122 is not limited to the display processing executed by the display processor 16. The instruction terminal 10 may execute other processing by utilizing the device information 122.

Furthermore, in the specifying processing according to the aforementioned embodiment, when no reply is made from the network device, test communication is performed by changing the port number while maintaining the protocol. Thus, searching of protocols is higher in priority than searching for port numbers. However, searching of the device parameters may be performed by prioritizing searching for port numbers. That is to say, the communication apparatus 20 may, when no reply is made from the network device, perform test communication by changing the protocol while maintaining the port number.

Furthermore, the functions of the instruction terminal 10 and the communication apparatus 20 can be achieved by dedicated hardware or by a normal computer system.

For example, distributing the program 39 to be executed by the processor 31 by storing the program 39 in a non-transitory computer-readable recording medium and then installing the program 39 on a computer can achieve a device for executing the aforementioned processing. A flexible disk, a compact disc read-only memory (CD-ROM), a digital versatile disc (DVD), and a magneto-optical (MO) disc, are conceivable as examples of such a recording medium.

Furthermore, the program 39 may be stored in a disk device included in a server device on a communication network such as the Internet and may be downloaded onto a computer by, for example, superimposing the program 39 on a carrier wave.

Furthermore, the aforementioned processing can also be achieved by starting and executing the program 39 while transferring the program 39 through the communication network.

Furthermore, the aforementioned processing can also be achieved by executing all or a portion of the program 39 on the server device and by executing, using the computer, a program while transmitting and receiving information relating to the processing via the communication network.

In the case in which the aforementioned functions are implemented by an operating system (OS) by allocation to the OS or are implemented by cooperation between the OS and an application, storage and distribution on the medium of only portions of the program 39 other than a portion of the program 39 executed by the OS is permissible. Alternatively, such portions of the program 39 may be downloaded to a computer.

Furthermore, means for achieving the functions of the instruction terminal 10 and the communication apparatus 20 is not limited to software, and a part of or all of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for setting of a network system.

REFERENCE SIGNS LIST

10 Instruction terminal
11 First instructor
12 Storage
13 Second instructor
14 Receiver
15 Third instructor
16 Display processor
20 Communication apparatus
21 Acquirer
22 Specifier
23 Transmitter
30 Network
301 Communication line
31 Processor
32 Main storage
33 Auxiliary storage
34 Inputter
35 Outputter
36 Communicator
37 Internal bus
39 Program
50 Communication device
61 Manufacturer specification code
62 Device-type specification code
71 Area
72 Label name
80 Candidate parameter
100 Communication system
101 User
121 Correspondence information
122 Device information
123 Device-type specification information
124 Label information

The invention claimed is:

1. A communication system comprising:
a communication apparatus to connect to a network; and
an instruction terminal to receive input from a user and to send instructions to the communication apparatus,
the instruction terminal including
a storage to store correspondence information that associates, for each of a plurality of communication devices, (a) identification information for identification of a communication device and (b) candidate parameters, the identification information being held by the communication device for unique identification thereof, the candidate parameters being candidates of a parameter for communication with the communication device,
a first instructor to issue to the communication apparatus an instruction to acquire the identification information of a network device that is a communication device of the communication devices and is connected to the communication apparatus via the network,
a second instructor to issue to the communication apparatus an instruction to specify, from among the candidate parameters that are included in the correspondence information and correspond to the identification information acquired in accordance with the instruction from the first instructor, a device parameter for communication with the network device, and
a receiver to receive, from the communication apparatus, specification information indicating the device parameter specified by the communication apparatus,
the communication apparatus including
an acquirer to acquire the identification information from the network device in accordance with the instruction from the first instructor,
a specifier to specify the device parameter from among the candidate parameters in accordance with the instruction from the second instructor, and
a transmitter to transmit the specification information to the instruction terminal.

2. The communication system according to claim 1, wherein the second instructor, with sending of notification of the candidate parameters to the communication apparatus, issues to the communication apparatus the instruction to specify the device parameter.

3. The communication system according to claim 1, wherein the acquirer acquires the identification information from the network device by transmitting, to destinations that each are an address within a range stipulated by the network, data for requesting sending of notification of the identification information.

4. The communication system according to claim 1, wherein the specifier, by communications with respect to the network device that are performed by using the candidate parameters, specifies the device parameter based on whether a reply is made by the network device in response to each of the communications.

5. The communication system according to claim 1, wherein
the candidate parameters include a priority parameter that is higher in priority than candidate parameters of the candidate parameters other than the priority parameter, and
the specifier, when the communication with the network device is established by any of the candidate parameters, specifies the priority parameter as the device parameter.

6. The communication system according to claim 1, wherein
the instruction terminal further includes
a third instructor to issue to the communication apparatus an instruction to send notification of a device type of the network device, and
a display processor to execute display processing based on the device type of the network device,
the specifier of the communication apparatus specifies the device type of the network device by querying the network device with respect to the device type of the network device in accordance with the instruction from the third instructor,
the transmitter of the communication apparatus transmits, to the instruction terminal, device-type information indicating the device type specified by the specifier,
the receiver of the instruction terminal receives the device-type information, and
the display processor of the instruction terminal executes the display processing based on the device-type information received by the receiver.

7. The communication system according to claim 6, wherein
the storage stores label information that associates device types of the communication devices and labels corresponding to addresses of memories included in the communication devices, and the display processor executes the display processing based on a label included in the label information and corresponding to the device type indicated by the device-type information.

8. A communication apparatus to connect to a network, comprising:
   an acquirer to acquire, from a network device connected to the communication apparatus via the network, identification information of the network device in accordance with an instruction from an instruction terminal, the identification information being held by the network device for unique identification thereof;
   a specifier to specify, in accordance with the instruction from the instruction terminal, from among candidate parameters corresponding to the identification information, a device parameter for communication with the network device, the candidate parameters corresponding to the identification information being included in candidate parameters that are candidates of parameters for communication with communication devices; and
   a transmitter to transmit, to the instruction terminal, specification information indicating the device parameter specified by the specifier.

9. A non-transitory recording medium storing a program causing a computer to function as:
   a first instructor to issue, to a communication apparatus to which a network device is connected via a network, an instruction to acquire identification information of the network device, the identification information being held by the network device for unique identification thereof;
   a second instructor to issue to the communication apparatus an instruction to specify, from among candidate parameters corresponding to the identification information acquired by the instruction of the first instructor, a device parameter for communication with the network device, the candidate parameters corresponding to the identification information being included in candidate parameters for communication with communication devices; and
   a receiver to receive, from the communication apparatus, specification information indicating the device parameter specified by the communication apparatus.

* * * * *